United States Patent
Shimizu et al.

(10) Patent No.: US 8,454,477 B2
(45) Date of Patent: Jun. 4, 2013

(54) POWER TRANSMITTING DEVICE AND VEHICLE HAVING SAME MOUNTED THEREON

(75) Inventors: Tetsuya Shimizu, Anjo (JP); Kazunori Ishikawa, Toyota (JP); Naoyuki Fukaya, Okazaki (JP); Kazuhiko Kato, Kariya (JP); Kenichi Tsuchida, Kazugun (JP)

(73) Assignee: Aisin AW Co., Ltd., Anjo (JP)

( * ) Notice: Subject to any disclaimer, the term of this patent is extended or adjusted under 35 U.S.C. 154(b) by 212 days.

(21) Appl. No.: 12/999,162

(22) PCT Filed: Oct. 8, 2009

(86) PCT No.: PCT/JP2009/067552
§ 371 (c)(1),
(2), (4) Date: Dec. 15, 2010

(87) PCT Pub. No.: WO2010/058660
PCT Pub. Date: May 27, 2010

(65) Prior Publication Data
US 2011/0088990 A1    Apr. 21, 2011

(30) Foreign Application Priority Data

Nov. 20, 2008  (JP) ................................. 2008-297253
Nov. 21, 2008  (JP) ................................. 2008-298527

(51) Int. Cl.
*F16H 61/00*  (2006.01)

(52) U.S. Cl.
USPC ............................................. 477/150; 475/61

(58) Field of Classification Search
USPC .............. 192/85.63; 475/61, 32; 477/69, 150, 477/159
See application file for complete search history.

(56) References Cited

U.S. PATENT DOCUMENTS 6,647,326 B2 *  11/2003  Nakamori et al. .............. 701/22
7,282,005 B2    10/2007  Shimizu et al.
(Continued)

FOREIGN PATENT DOCUMENTS

CN    1667301 A    9/2005
CN    1779295 A    5/2006
(Continued)

OTHER PUBLICATIONS

Jul. 24, 2012 Partial Translation of Notification of Reasons for Refusal issued in Japanese Patent Application No. 2008-297253.
(Continued)

*Primary Examiner* — Justin Holmes
*Assistant Examiner* — Stacey Fluhart
(74) *Attorney, Agent, or Firm* — Oliff & Berridge, PLC

(57) ABSTRACT

A power transmission configured with a mechanical pump that generates and deliver a fluid pressure to a clutch. An electromagnetic pump generates and delivers a fluid pressure to the clutch, and an accumulator connects the clutch and the electromagnetic pump, and accumulates fluid pressure acting there between. A switching valve selectively switches between connecting the mechanical pump side and the clutch in a fluid communicating manner and connecting the electromagnetic pump and the clutch in a fluid communicating manner. A valve drive portion that drives the switching valve so as to connect the mechanical pump side and the clutch when the mechanical pump is driving, and drives the switching valve so as to connect the electromagnetic pump and the clutch when the electromagnetic pump is driving in place of the mechanical pump.

10 Claims, 11 Drawing Sheets

U.S. PATENT DOCUMENTS

| | | |
|---|---|---|
| 8,066,595 B2 | 11/2011 | Ogata et al. |
| 2003/0045988 A1 | 3/2003 | Suzuki et al. |
| 2003/0109970 A1* | 6/2003 | Nakamori et al. .............. 701/22 |
| 2003/0171867 A1 | 9/2003 | Nakamori et al. |
| 2005/0211295 A1* | 9/2005 | Long et al. .................... 137/112 |
| 2010/0028168 A1* | 2/2010 | Shimizu et al. ............... 417/213 |
| 2010/0193315 A1* | 8/2010 | Shimizu et al. ............ 192/85.63 |
| 2011/0174107 A1* | 7/2011 | Shimizu et al. ............ 74/473.11 |
| 2011/0237395 A1* | 9/2011 | Shimizu et al. ............... 477/168 |

FOREIGN PATENT DOCUMENTS

| | | |
|---|---|---|
| JP | A-2000-46166 | 2/2000 |
| JP | A-2001-41067 | 2/2001 |
| JP | A-2003-74689 | 3/2003 |
| JP | A-2003-240110 | 8/2003 |
| JP | A-2007-320353 | 12/2007 |
| JP | A-2008-180303 | 8/2008 |

OTHER PUBLICATIONS

Jul. 24, 2012 Partial Translation of Notification of Reasons for Refusal issued in Japanese Patent Application No. 2008-298527.

International Search Report for International Patent Application No. PCT/JP2009/067552, mailed on Jan. 12, 2010 (w/ English translation).

Feb. 4, 2013 Office Action issued in Chinese Patent Application No. 200980125294.8 (English translation only).

Feb. 4, 2013 Search Report issued in Chinese Patent Application No. 200980125294.8 (English translation only).

* cited by examiner

FIG.3

| | | C1 | C2 | C3 | B1 | B2 | B3 | B4 | F1 | F2 | F3 |
|---|---|---|---|---|---|---|---|---|---|---|---|
| | P | | | | | | | | | | |
| | R | | | O | (O) | | | O | O | | |
| | N | | | | | | | | | | |
| D | 1st | O | | | | | | (O) | | | O |
| | 2nd | O | | | | (O) | O | | O | O | |
| | 3rd | O | | O | (O) | | ● | | O | | |
| | 4th | O | O | ● | | | ● | | | | |
| | 5th | | O | O | O | | ● | | | | |

(O): ENGINE BRAKE IN OPERATION
●: ENGAGED BUT NO TORQUE TRANSMITTED

POWER TRANSMITTING DEVICE AND VEHICLE HAVING SAME MOUNTED THEREON

INCORPORATION BY REFERENCE

The disclosure of Japanese Patent Application Nos. 2008-298527 filed on Nov. 21, 2008 and 2008-297253 filed on Nov. 20, 2008 including the specifications, drawings and abstracts are incorporated herein by reference in their entirety.

BACKGROUND OF THE INVENTION

The present invention relates to a power transmission device and a vehicle having the power transmission device. More specifically, the present invention relates to a power transmission device having an input shaft connected to an output shaft of a motor and an output shaft connected to an axle side of a vehicle, and power input to the input shaft is transmitted to the output shaft by switching an engagement state of a clutch; and a vehicle having the power transmission device.

DESCRIPTION OF THE RELATED ART

A conventional vehicle of this type has an engine capable of an automatic stop and an automatic start, and a power transmission device that transmits power from the engine. In such a vehicle, a mechanical oil pump that drives using power from the engine and an electric oil pump that drives by receiving a supply of power from a battery are used as pumps that generate hydraulic pressure for engaging hydraulically-driven clutches and brakes provided in an automatic transmission (see Japanese Patent Application Publication No. JP-A-2003-74689, for example). According to the device of JP-A-2003-74689, the electric oil pump is driven instead of the mechanical oil pump when the engine automatically stops due to stopping of the vehicle, and a clutch C1 that forms a first forward speed is held in a pre-engagement state. Consequently, when a start-off request from the driver causes the engine to restart and the clutch C1 is engaged for starting off, a delay in engagement of the clutch C1 at such time can be suppressed.

SUMMARY OF THE INVENTION

In the type of power transmission device described above, the electric oil pump is normally provided in parallel with the mechanical oil pump. Oil that is pressure fed from either the electric oil pump or the mechanical oil pump generates a line pressure that is supplied to an entire hydraulic circuit. The line pressure in the hydraulic circuit is regulated by a pressure-regulating valve and then supplied to corresponding clutches and brakes. However, the relatively high pressure-feeding capability required of the electric oil pump enlarges the physical size of the electric oil pump, which may increase the size of the device overall.

A power transmission device and a vehicle having the same of the present invention suitably transmit power from a motor.

The power transmission device and the vehicle having the same of the present invention employ the following to achieve the above.

A power transmission device according to the present invention has an input shaft connected to an output shaft of a motor, and an output shaft connected to an axle side of a vehicle, wherein power input to the input shaft is transmitted to the output shaft by switching an engagement state of a clutch. The power transmission device includes: a mechanical pump that uses power from the motor to generate and deliver a fluid pressure to the clutch; an electromagnetic pump that receives a supply of power to drive, and generates and delivers a fluid pressure to the clutch; an accumulator that is connected to an oil passage that connects the clutch and the electromagnetic pump, and accumulates fluid pressure acting on the clutch and the electromagnetic pump; a switching valve that selectively switches between connecting the mechanical pump side and the clutch in a fluid communicating manner and connecting the electromagnetic pump and the clutch in a fluid communicating manner; and a valve drive portion that drives the switching valve so as to connect the mechanical pump side and the clutch when the mechanical pump is driving, and drives the switching valve so as to connect the electromagnetic pump and the clutch when the electromagnetic pump is driving in place of the mechanical pump.

The power transmission device of the present invention is provided with a mechanical pump that uses power from the motor to generate and deliver a fluid pressure to the clutch; an electromagnetic pump that receives a supply of power to drive, and generates and delivers a fluid pressure to the clutch; an accumulator that is connected to an oil passage that connects the clutch and the electromagnetic pump, and accumulates fluid pressure acting on the clutch and the electromagnetic pump; a switching valve that selectively switches between connecting the mechanical pump side and the clutch in a fluid communicating manner and connecting the electromagnetic pump and the clutch in a fluid communicating manner; and a valve drive portion that drives the switching valve so as to connect the mechanical pump side and the clutch when the mechanical pump is driving, and drives the switching valve so as to connect the electromagnetic pump and the clutch when the electromagnetic pump is driving in place of the mechanical pump. Thus, when the electromagnetic pump is driving in place of the mechanical pump, fluid pressure accumulated in the accumulator can flow to the electromagnetic pump side by switching a flow passage of the switching valve. Therefore, momentary drops in the hydraulic pressure of the clutch can be suppressed. In addition, if fluid pressure from the electromagnetic pump acts on the clutch that connects between the input and output shafts before the output of power from the motor is started, the transmission of power from the motor can be promptly started after the mechanical pump starts to operate using power from the motor. As a consequence, power can be suitably transmitted from the motor. Here, in addition to including an internal combustion engine capable of an automatic stop and an automatic start, the term "motor" also includes an electric motor. In addition to including a normal clutch that connects two rotating systems, the term "clutch" also includes a brake that connects one rotating system to a fixing system such as a case.

In the power transmission device according to the present invention described above, the accumulator may be designed with a capacity that fills a flow passage that connects the clutch and the electromagnetic pump with operation fluid. Thus, momentary drops in the hydraulic pressure of the clutch can be reliably suppressed.

In the power transmission device according to the present invention, the switching valve may include: a hollow sleeve formed with a first input port that is input with operation fluid from the mechanical pump, a second input port that is input with operation fluid from the electromagnetic pump, and an output port that outputs the inputted operation fluid to the clutch; and a spool that is a shaft-like member accommodated in the sleeve, and is moved in the axial direction by the valve drive portion to switch between a state that closes the second input port and communicates the first input port with the output port and a state that closes the first input port and communicates the second input port with the output port. The accumulator may be connected to a flow passage that connects the output port of the switching valve and the clutch such that, when the valve drive portion causes a flow passage of the switching valve to switch and connect the electromagnetic pump and the clutch, accumulated fluid pressure can be delivered to the electromagnetic pump through communication between the output port and the second input port of the switching valve. Alternatively, in the power transmission device according to the present invention, the switching valve may include: a hollow sleeve formed with an input port that is input with operation fluid from the mechanical pump, and an output port that outputs the inputted operation fluid to the clutch; and a spool that is a shaft-like member accommodated in the sleeve, and is moved in the axial direction by the valve drive portion to switch between a state that communicates the input port with the output port and a state that cuts off communication between the input port and the output port. The electromagnetic pump may be connected to a flow passage that connects the output port of the switching valve and the clutch. The accumulator may be connected to a flow passage that connects the output port of the switching valve and the clutch such that, when the valve drive portion causes a flow passage of the switching valve to switch and cut off the connection between the mechanical pump and the clutch, accumulated fluid pressure can be delivered to the electromagnetic pump.

The power transmission device according to the present invention may further include: a control unit that performs a stoppage control that drivingly controls the electromagnetic pump, such that a lower fluid pressure than that when the clutch is completely engaged acts on the clutch in association with switching of the flow passage of the switching valve by the valve drive portion when stopping of the vehicle stops the motor. Thus, the transmission of power from the motor can be promptly started when the mechanical pump starts to operate using power from the motor. In addition, the physical size of the electromagnetic pump can be made small because only low hydraulic pressure from the electromagnetic pump need act on the clutch. The power transmission device according to this mode of the present invention may further include: a regulator valve that regulates a fluid pressure generated by the mechanical pump to generate a line pressure, wherein as the stoppage control, the control unit controls the regulator valve so as to increase the fluid pressure from the mechanical pump side acting on the clutch before the motor stops. Thus, an accumulation of fluid pressure in the accumulator can be promoted before the motor stops. The power transmission device according to these modes of the present invention may further include: an automatic transmission capable of changing a transmission gear ratio and transmitting power from the motor to the axle side by switching an engagement state of a plurality of clutches, wherein the control unit performs the stoppage control on a clutch among the plurality of clutches that forms a transmission gear ratio for start-off if stopping of the vehicle stops the motor. Thus, the transmission gear ratio for start-off can be formed once the output of power from the motor is started so as to ensure a smooth start-off.

In the power transmission device according to the present invention, the valve drive portion may be constituted so as to one of directly and indirectly guide a fluid pressure as a signal pressure from the mechanical pump to the switching valve to drive the switching valve, and the switching valve may be constituted so as to connect the mechanical pump side and the clutch in a fluid communicating manner when the signal pressure is guided to the switching valve, and connect the electromagnetic pump and the clutch in a fluid communicating manner when the signal pressure is not guided to the switching valve. Thus, a more downsized device overall can be achieved with a switching valve that switches using a simple structure.

The power transmission device according to the present invention may further include: a pressure regulating valve that regulates and delivers a fluid pressure generated by the mechanical pump to the clutch, wherein the pressure regulating valve and the electromagnetic pump are formed integrated as a solenoid valve, and the solenoid valve includes: a hollow sleeve that is formed with various ports; a spool that is a shaft-like member accommodated in the sleeve, and opens and closes the various ports by sliding in the axial direction; a spring that biases the spool in the axial direction; and a solenoid portion that generates thrust acting on the spool in a direction that opposes the spring. A first port group including an input port that is input with operation fluid from the mechanical pump side, an output port that outputs operation fluid to the clutch side, and a discharge port is formed from among the various ports, and a pressure regulating chamber is formed between the sleeve and the spool so as to function as the pressure regulating valve that, by sliding of the spool in the axial direction, regulates a pressure of operation fluid that is input to the input port by discharge from the drain port and outputs operation fluid from the output port. A second port group including an intake port that intakes operation fluid from the mechanical pump side, and a discharge port that discharges operation fluid to the clutch is formed from among the various ports, and a pump chamber is defined as a space between the sleeve and the spool and as cut off from the pressure regulating chamber so as to function as the electromagnetic pump that, by repeated generation and cancellation of the thrust from the solenoid portion, intakes operation fluid through the intake port and discharges operation fluid from the discharge port. Consequently, a more downsized device can be achieved compared to one that separately provides a pressure regulating valve and an electromagnetic pump. One solenoid portion is used as a drive source of both the pressure regulating valve and the electromagnetic pump, which means that the solenoid valve cannot achieve the pressure regulating valve function and the electromagnetic pump function at the same time. Therefore, preparations to drive the electromagnetic pump cannot be made when the solenoid valve is functioning as the pressure regulating valve. However, because fluid pressure accumulated in the accumulator flows to the electromagnetic pump side, the solenoid valve can smoothly switch from pressure regulating valve function to the electromagnetic pump function.

A vehicle of the present invention is installed with a motor and a power transmission device of the present invention according to any of the modes described above. Namely, the power transmission device essentially has an input shaft connected to an output shaft of a motor, and an output shaft connected to an axle side of a vehicle, wherein power input to the input shaft is transmitted to the output shaft by switching an engagement state of a clutch. The power transmission device includes: a mechanical pump that uses power from the motor to generate and deliver a fluid pressure to the clutch; an electromagnetic pump that receives a supply of power to drive, and generates and delivers a fluid pressure to the clutch; an accumulator that is connected to an oil passage that connects the clutch and the electromagnetic pump, and accumulates fluid pressure acting on the clutch and the electromagnetic pump; a switching valve that selectively switches between connecting the mechanical pump side and the clutch in a fluid communicating manner and connecting the electromagnetic pump and the clutch in a fluid communicating manner; and a valve drive portion that drives the switching valve so as to connect the mechanical pump side and the clutch when the mechanical pump is driving, and drives the switching valve so as to connect the electromagnetic pump and the clutch when the electromagnetic pump is driving in place of the mechanical pump.

The vehicle of the present invention is installed with the power transmission device of the present invention of any of the modes described above. Therefore, effects achieved by the power transmission of the present invention, for example, an effect of suppressing momentary drops in the hydraulic pressure of the clutch, an effect of promptly starting the transmission of power from the motor, and an effect of a more downsized device overall by integrating the pressure regulating valve and the electromagnetic pump, can be achieved by the vehicle of the present invention.

BRIEF DESCRIPTION OF THE DRAWINGS

FIG. 3 is an explanatory drawing that shows an operation chart of the automatic transmission 30;

DETAILED DESCRIPTION OF THE EMBODIMENT

Next, an embodiment will be used to describe a best mode for carrying out the present invention.

Figure 1:
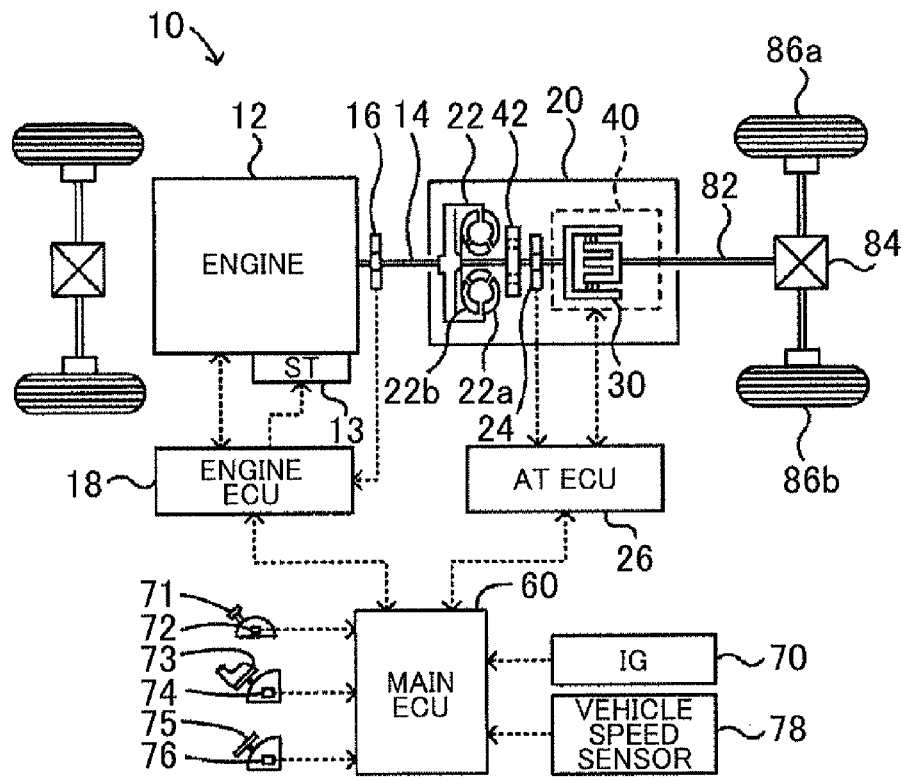
FIG. 1 is a structural diagram that shows an outline of the constitution of an automobile 10 incorporated with a power transmission device 20 serving as an embodiment of the present invention.
Figure 2:
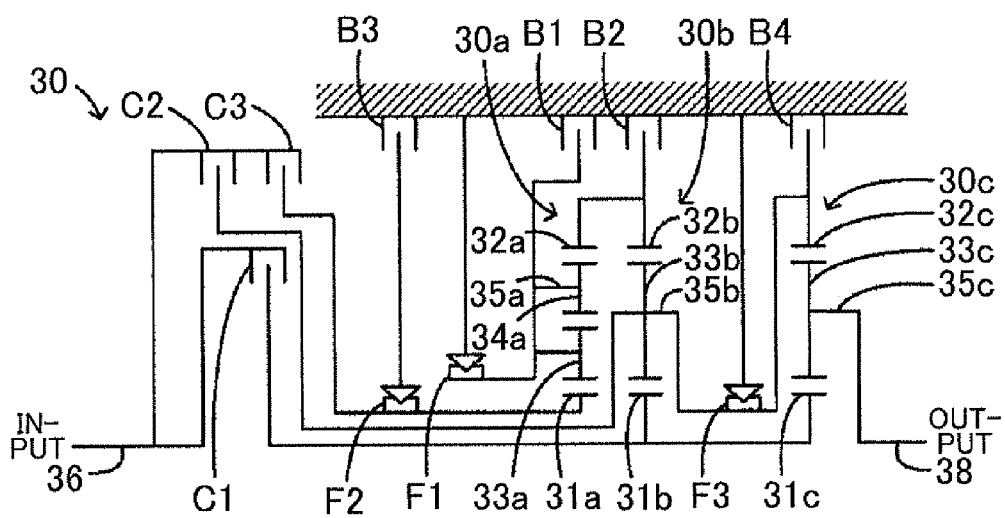
FIG. 2 is a structural diagram that shows an outline of the constitution of an automatic transmission 30 provided in the power transmission device 20 of the embodiment.

FIG. 1 is a structural diagram that shows an outline of the constitution of an automobile 10 incorporated with a power transmission device 20 serving as an embodiment of the present invention. FIG. 2 is a structural diagram that shows an outline of the constitution of an automatic transmission 30 provided in the power transmission device 20 of the embodiment. FIG. 3 is an explanatory drawing that shows an operation chart of the automatic transmission 30.

As FIG. 1 shows, an automobile 10 of the present embodiment includes an engine 12 and a power transmission device 20. The engine 12 is an internal combustion engine that outputs power by explosive combustion of a hydrocarbon fuel such as gasoline or diesel. The power transmission device 20 of the embodiment is connected to a crankshaft 14 of the engine 12, as well as to a drive shaft 82 connected to right and left wheels 86a, 86b through a differential gear 84, and transmits power from the engine 12 to the drive shaft 82.

The engine 12 is operated and controlled by an engine electronic control unit (hereinafter referred to as an engine ECU) 18. The engine ECU 18, although not shown in detail in the drawings, is constituted as a microprocessor based on a CPU. In addition to the CPU, the engine ECU 18 has a ROM that stores processing programs, a RAM that temporarily stores data, input and output ports, and a communication port. The engine ECU 18 is input through the input port with signals from various sensors required for operating and controlling the engine 12, such as a rotation speed sensor 16 attached to a crankshaft 14. The engine ECU 18 outputs through the output port a drive signal to a throttle motor that adjusts the throttle opening, a control signal to a fuel injection valve, an ignition signal to a spark plug, a drive signal to a starter motor 13 that cranks the engine 12, and the like. The engine ECU 18 communicates with a main electronic control unit (hereinafter referred to as a main ECU) 60 that controls the vehicle overall. The engine ECU 18 controls the engine 12 based on a control signal from the main ECU 60, and outputs data relating to the operation status of the engine 12 to the main ECU 60 as necessary.

The power transmission device 20 of the embodiment is formed as a transaxle device that transmits power from the engine 12 to the drive shaft 82, and includes a torque converter 22, a mechanical oil pump 42, the automatic transmission 30, a hydraulic circuit 40, an automatic transmission electronic control unit (hereinafter referred to as an AT ECU) 26, and the main ECU 60. The torque converter 22 has a lock-up clutch and is formed from an input side pump impeller 22a that is connected to the crankshaft 14 of the engine 12, and an output side turbine runner 22b. The mechanical oil pump 42 is disposed downstream of the torque converter 22 and pressure feeds operation oil based on the power from the engine 12. The automatic transmission 30 is staged and driven by hydraulic pressure. In addition, the automatic transmission 30 has the input shaft 36 connected to the turbine runner 22b side of the torque converter 22 and an output shaft 38 that is connected to the drive shaft 82. The automatic transmission changes the speed of power input to the input shaft 36, which it then outputs to the output shaft 38. The hydraulic circuit 40 is an actuator that drives the automatic transmission 30. The AT ECU 26 controls the automatic transmission 30 (hydraulic circuit 40).

As shown in FIG. 2, the automatic transmission 30 has a double-pinion type planetary gear mechanism 30a; two single-pinion type planetary gear mechanisms 30b, 30c; three clutches C1, C2, C3; four brakes B1, B2, B3, B4; and three one-way clutches F1, F2, F3. The double-pinion type planetary gear mechanism 30a has a sun gear 31a with external teeth; a ring gear 32a with internal teeth that is disposed concentrically with respect to the sun gear 31a; a plurality of first pinion gears 33a that mesh with the sun gear 31a; a plurality of second pinion gears 34a that mesh with the plurality of first pinion gears 33a and also mesh with the ring gear 32a; and a carrier 35a that is connected to and also rotatably and revolvably holds the plurality of first pinion gears 33a and the plurality of second pinion gears 34a. The sun gear 31a is connected to the input shaft 36 through the clutch C3. The sun gear 31a is also connected to the brake B3 through the one-way clutch F2, and the rotation of the sun gear 31a is permitted or held stationary by engaging and disengaging the brake B3. The rotation of the ring gear 32a is permitted or held stationary by engaging and disengaging the brake 132. The carrier 35a is restricted to rotation in one direction by the one-way clutch F1, and the rotation of the carrier 35a is permitted or held stationary by engaging and disengaging the brake B1. The single-pinion type planetary gear mechanism 30b has a sun gear 31b with external teeth; a ring gear 32b with internal teeth that is disposed concentrically with respect to the sun gear 31b; a plurality of pinion gears 33b that mesh with the sun gear 31b and the ring gear 32b; and a carrier 35b that rotatably and revolvably holds the plurality of pinion gears 33b. The sun gear 31b is connected to the input shaft 36 through the clutch C1. The ring gear 32b is connected to the ring gear 32a of the double-pinion type planetary gear mechanism 30a, and the rotation of the ring gear 32b is permitted or held stationary by engaging and disengaging the brake B2. The carrier 35b is connected to the input shaft 36 through the clutch C2, and the carrier 35b is restricted to rotation in one direction by the one-way clutch F3. The single-pinion type planetary gear mechanism 30c has a sun gear 31c with external teeth; a ring gear 32c with internal teeth that is disposed concentrically with respect to the sun gear 31c; a plurality of pinion gears 33c that mesh with the sun gear 31c and the ring gear 32c; and a carrier 35c that rotatably and revolvably holds the plurality of pinion gears 33c. The sun gear 31c is connected to the sun gear 31b of the single-pinion type planetary gear mechanism 30b. The ring gear 32c is connected to the carrier 35b of the single-pinion type planetary gear mechanism 30b, and the rotation of the ring gear 32c is permitted or held stationary by engaging and disengaging the brake B4. The carrier 35c is connected to the output shaft 38.

As shown in FIG. 3, the automatic transmission 30 can switch among first to fifth forward speeds, one reverse speed, and neutral by engaging and disengaging the clutches C1 to C3 and the brakes B1 to B4. The first forward speed, namely the state of decelerating the rotation of the input shaft 36 at the largest reduction ratio and transmitting such rotation to the output shaft 38, is formed by engaging the clutch C1, and disengaging the clutches C2, C3 and the brakes B1 to B4. In the first forward speed, during engine braking, the brake B4 is engaged instead of the one-way clutch F3 to hold the ring gear 32c stationary. The second forward speed is fanned by engaging the clutch C1 and the brake B3, and disengaging the clutches C2, C3 and the brakes B1, B2, B4. In the second forward speed, during engine braking, the brake B2 is engaged instead of the one-way clutch F1 and the one-way clutch F2 to hold the ring gear 32a and the ring gear 32b stationary. The third forward speed is formed by engaging the clutches C1, C3 and the brake B3, and disengaging the clutch C2 and the brakes B1, B2, B4. The fourth forward speed is formed by engaging the clutches C1 to C3 and the brake B3, and disengaging the brakes B1, B2, B4. The fifth forward speed, namely the state of decelerating (accelerating) the rotation of the input shaft 36 at the smallest reduction ratio and transmitting such rotation to the output shaft 38, is formed by engaging the clutches C2, C3 and the brakes B1, B3, and disengaging the clutch C1 and the brakes B2, B4. Neutral in the automatic transmission 30, namely the state of uncoupling the input shaft 36 and the output shaft 38, is achieved by disengaging all the clutches C1 to C3 and the brakes B1 to B4. The reverse speed is formed by engaging the clutch C3 and the brake B4, and disengaging the clutches C1, C2 and the brakes B1 to B3.

Figure 4:
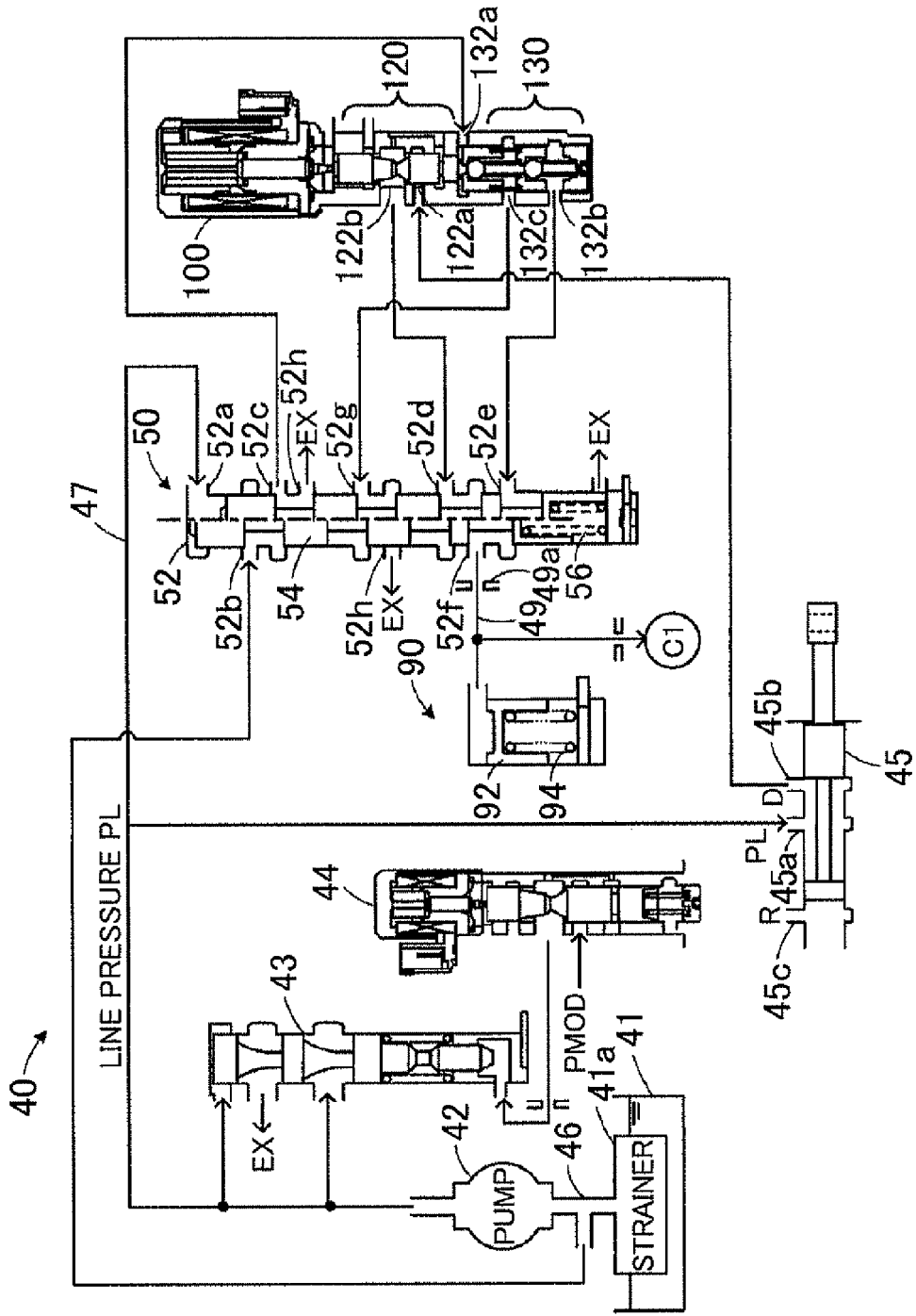
FIG. 4 is a partial structural diagram that shows an outline of the constitution of a drive system of a clutch C1 in a hydraulic circuit 40.

Engaging and disengaging of the clutches C1 to C3 and the brakes B1 to B4 of the automatic transmission 30 is performed by the hydraulic circuit 40. FIG. 4 is a partial structural diagram that shows an outline of the constitution of a drive system of the clutch C1 in the hydraulic circuit 40. As shown in FIG. 4, the hydraulic circuit 40 includes: an oil pan 41, a strainer 41a, a regulator valve 43, a linear solenoid 44, a manual valve 45, a solenoid valve 100, a switching valve 50, and an accumulator 90. The oil pan 41 accumulates operation oil. The strainer 41a filters operation oil accumulating in the oil pan 41. The regulator valve 43 regulates a pressure (line pressure PL) of operation oil that is pressure fed by the mechanical oil pump 42, using power from the engine 12, from the oil pan 41 through the strainer 41a. The linear solenoid 44 regulates a modulator pressure PMOD that is generated from the line pressure PL through a modulator valve (not shown) and outputs the modulator pressure PMOD as a signal pressure so as to drive the regulator valve 43. The manual valve 45 is formed with an input port 45a that is input with the line pressure PL, a Drive-position (D-position) output port 45b, and a Reverse-position (R-position) output port 45c, and the like. The manual valve 45 opens and closes each port in association with the operation of a shift lever 71. The solenoid valve 100 functions as a linear solenoid that is input with and regulates operation oil output from the D-position output port 45b of the manual valve 45, and outputs operation oil to the clutch C1 side. The solenoid valve 100 also functions as an electromagnetic pump that pressure feeds operation oil to the clutch C1. The switching valve 50 is selectively input with operation oil from the solenoid valve 100 functioning as a linear solenoid and operation oil from the solenoid valve 100 functioning as an electromagnetic pump, and outputs operation oil to the clutch C1 side. The accumulator 90 is linked to an oil passage between the clutch C1 and the switching valve 50, functions as a damper that absorbs pulses in hydraulic pressure from each pump to suppress sudden changes in the hydraulic pressure acting on the clutch C1, and accumulates hydraulic pressure acting on the clutch C1. An oil passage 49 that connects the switching valve 50 and the accumulator 90 is provided with an orifice 49a. Note that FIG. 4 only shows the hydraulic system of the clutch C1, and does not show the hydraulic systems for the other clutches C2, C3 or the brakes B1 to B4 because they are not central to the present invention. These hydraulic systems may be configured using common linear solenoids or the like. The solenoid valve 100 provided in the hydraulic circuit 40 will be described in further detail below.

Figure 5:
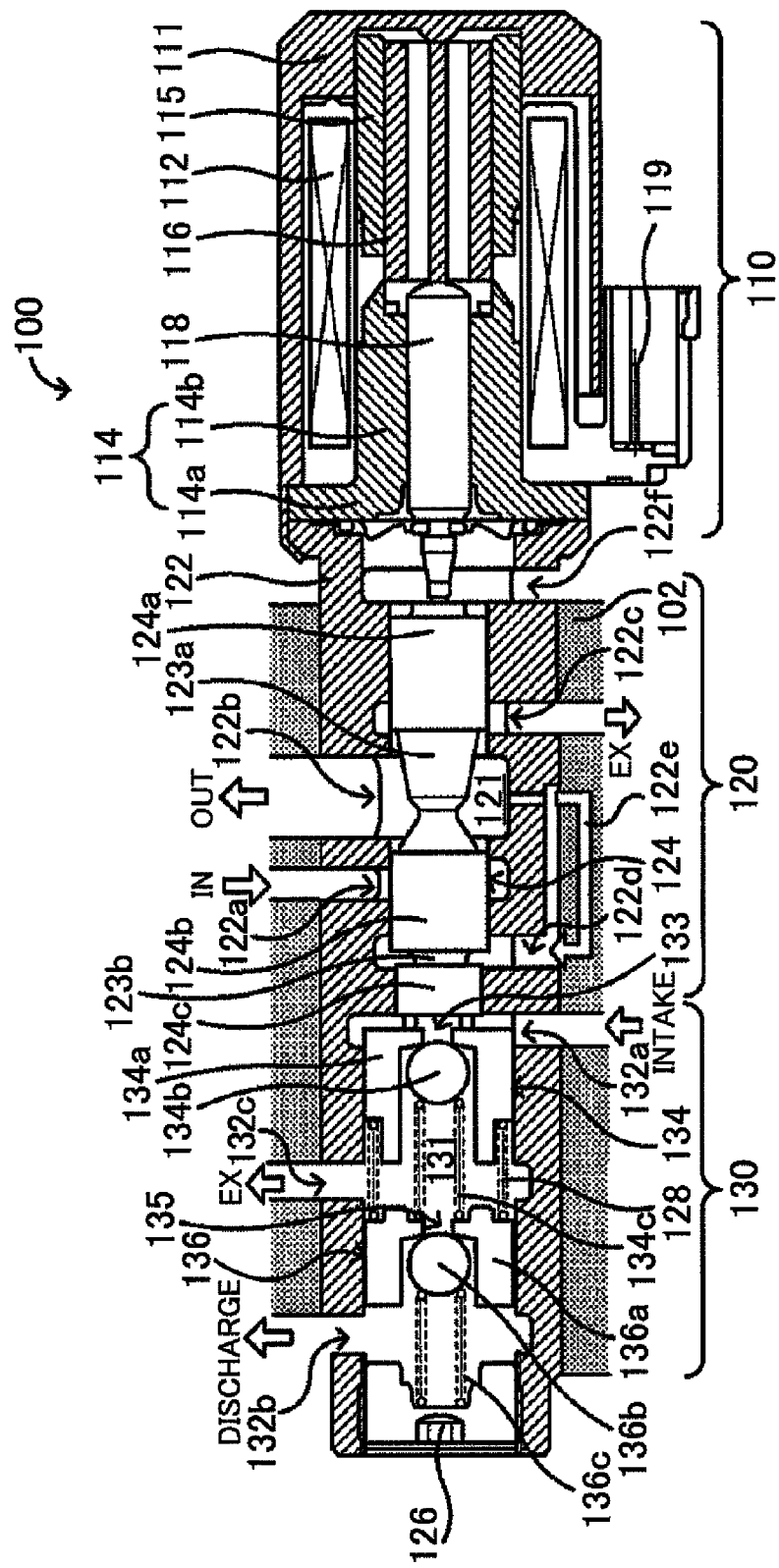
FIG. 5 is a structural diagram that shows an outline of the constitution of a solenoid valve 100.

FIG. 5 is a structural diagram that shows an outline of the constitution of the solenoid valve 100. The solenoid valve 100 is formed so as to function as a linear solenoid for direct control that is capable of directly controlling the clutch C1 by generating an optimal clutch pressure from the line pressure PL input through the manual valve 45, and function as an electromagnetic pump that generates hydraulic pressure. The solenoid valve 100 has a solenoid portion 110, a pressure regulating valve portion 120 that is driven by the solenoid portion 110, input with the line pressure PL, and regulates and outputs the input line pressure PL, and a pump portion 130 that is similarly driven by the solenoid portion 110 and pressure feeds operation oil.

The solenoid portion 110 includes: a case 111, a coil (solenoid coil) 112, a first core 114, a second core 115, a plunger 116, and a shaft 118. The case 111 is a bottomed cylindrical member. The coil 112 is disposed on the inner peripheral side of the case 111 and formed by winding an insulated electrical conductor around an insulative bobbin. The first core 114 is formed with a flange portion 114a whose flange outer peripheral portion is fixed to the opening end portion of the case 111, and also formed with a cylindrical portion 114b that extends in the axial direction along the inner peripheral face of the coil 112 from the flange portion 114a. The cylindrical second core 115 contacts the inner peripheral face of a recess portion formed on the bottom of the case 111, and extends in the axial direction along the inner peripheral face of the coil 112 up to a position that is separated from the cylindrical portion 114b of the first core 114 by a predetermined distance. The plunger 116 is accommodated in the second core 115, and can slide in the axial direction on the inner peripheral face of the first core 114 and the inner peripheral face of the second core 115. The shaft 118 is accommodated in the cylindrical portion 114b of the first core 114 while contacting the tip of the plunger 116, and can slide in the axial direction on the inner peripheral face of the cylindrical portion 114b. The solenoid portion 110 is arranged on a connector portion 119 with a terminal from the coil 112 formed on the outer peripheral portion of the case 111, and electricity is conducted to the coil 112 through this terminal. The case 111, the first core 114, the second core 115, and the plunger 116 are all formed by a ferromagnetic material such as highly pure iron or the like. A space between the end face of the cylindrical part 114b of the first core 114 and the end face of the second core 115 is formed to function as a non-magnetic body. It should be noted that this space may be provided as a non-magnetic metal such as stainless steel, brass, or the like so long as it functions as a non-magnetic body. In the solenoid portion 110, the conduction of electricity to the coil 112 forms a magnetic circuit in which magnetic flux circles around the coil 112 to the case 111, the second core 115, the plunger 116, the first core 114, and back to the case 111 in that order. Consequently, an attractive force acting between the first core 114 and the plunger 116 attracts the plunger 116. As described above, the tip of the plunger 116 contacts the shaft 118 that is slidable in the axial direction on the inner peripheral face of the first core 114. Therefore, the attractive force acting on the plunger 116 causes the shaft 118 to extrude forward (left in the figure).

The pressure regulating valve portion 120 and the pump portion 130 use the following members in common: a sleeve 122, a spool 124, an end plate 126, and a spring 128. The generally cylindrical sleeve 122 is incorporated into a valve body 102, with an end attached to the first core 114 by the case 111 of the solenoid portion 110. The spool 124 is accommodated in the interior space of the sleeve 122, with an end contacting the tip of the shaft 118 of the solenoid portion 110. The end plate 126 is threadedly fastened to another end of the sleeve 122. The spring 128 biases the spool 124 toward the solenoid portion 110 side.

The sleeve 122 is formed with an input port 122a, an output port 122b, a drain port 122c, and a feedback port 122d that are opening portions in an area forming the pressure regulating valve portion 120. The input port 122a is input with operation oil from the D-position output port 45b of the manual valve 45. The output port 122b discharges operation oil input to the clutch C1 side. The drain port 122c drains input operation oil. The feedback port 122d is input with operation oil that is output from the output port 122b through an oil passage 122e, which is formed from the inner surface of the valve body 102 and the outer surface of the sleeve 122, and applies a feedback force to the spool 124. An end portion on the solenoid portion 110 side of the sleeve 122 is also formed with a discharge hole 122f for discharging operation oil that has leaked out from between the inner peripheral surface of the sleeve 122 and the outer peripheral surface of the spool 124 due to sliding of the spool 124. The sleeve 122 is further formed with an intake port 132a, a discharge port 132b, and a drain port 132c that are opening portions in an area forming the pump portion 130. The intake port 132a intakes operation oil, and the discharge port 132b discharges intaken operation oil. The drain port 132c discharges residual operation oil when the pump portion 130 stops functioning.

The spool 124 is formed as a shaft-like member accommodated inside the sleeve 122, and has three cylindrical lands 124a, 124b, 124c that can slide on the inner wall of the sleeve 122, a communication portion 123a, a connection portion 123b, an intake check valve 134 that is connected to the land 124c, and a discharge check valve 136 that is interposed between the intake check valve 134 and the end plate 126. The communication portion 123a connects the land 124a and the land 124b, and has a tapered shape such that the outer radius of the communication portion 123a is smaller than the outer radii of the lands 124a, 124b and the outer radius becomes smaller toward a center portion from both the lands 124a, 124b. In addition, the communication portion 123a enables communication between the input port 122a, the output port 122b and the drain port 122c. The connection portion 123b connects the land 124b and the land 124c whose outer diameter is smaller than that of the land 124b. Together with the inner wall of the sleeve 122, the connection portion 123b forms a feedback chamber for applying the feedback force to the spool 124 in the direction of the solenoid portion 110 side. A pressure regulating chamber 121 is formed from the sleeve 122, the communication portion 123a of the spool 124, and the lands 124a, 124b. A pump chamber 131 is formed from the sleeve 122, and the intake and discharge check valves 134, 136 of the spool 124.

The intake check valve 134 of the pump portion 130 includes: a cylindrical body 134a that is connected to the land 124c and whose center is foamed with an opening portion 133 that communicates with the pump chamber 131 and the intake port 132a; a ball 134b; and a spring 134c that presses the ball 134b against the opening portion 133 of the body 134a. When there is positive pressure inside the pump chamber 131, the biasing force of the spring 134c blocks the opening portion 133 to close the valve. When there is negative pressure inside the pump chamber 131, contraction of the spring 134c unblocks the opening portion 133 to open the valve. The discharge check valve 136 includes: a cylindrical body 136a that functions as a spring receiver that receives the spring 128 and the spring 134c of the intake check valve 134, and whose center is formed with an opening portion 135 that communicates with the discharge port 132b; a ball 136b; and a spring 136c that presses the ball 136b against the opening portion 135 of the body 136a with the end plate 126 acting as a spring receiver. When there is negative pressure inside the pump chamber 131, the biasing force of the spring 136c blocks the opening portion 135 to close the valve. When there is positive pressure inside the pump chamber 131, contraction of the spring 136c unblocks the opening portion 135 to open the valve. Therefore, when conduction to the coil 112 of the solenoid portion 110 is switched from on to off, the biasing force of the spring 136c and the spring 128 moves the spool 124 to the solenoid portion 110 side, which generates negative pressure inside the pump chamber 131 and causes the pump chamber 131 to intake operation oil from the intake port 132a through the discharge check valve 134. However, when conduction to the coil 112 of the solenoid portion 110 is switched from off to on, thrust from the solenoid portion 110 moves the spool 124 to the end plate 126 side, which generates positive pressure inside the pump chamber 131 and causes intaken operation oil to be discharged from the discharge port 132b through the discharge check valve 136.

Next, operations of the solenoid valve 100 when functioning as a linear solenoid and when functioning as an electromagnetic pump will be described. The operation when functioning as a linear solenoid will be explained first. Here, a case where conduction to the coil 112 is switched off will be considered. In this case, because the spool 124 is moved to the solenoid portion 110 side by the biasing force of the springs 128, 134c, 136c, the land 124b blocks the input port 122a and the output port 122b communicates with the drain port 122c through the communication portion 123a. Therefore, no hydraulic pressure acts on the clutch C1. Once conduction to the coil 112 is switched on, the plunger 116 becomes attracted to the first core 114 by an attractive force corresponding to the magnitude of current applied to the coil 112, and the shaft 118 extrudes accordingly. The spool 124 that contacts the tip of the shaft 118 thus moves to the end plate 126 side. Consequently, the input port 122a, the output port 122b, and the drain port 122c communicate with one another, and operation oil input from the input port 122a is partially output to the output port 122b while the rest is output to the drain port 122c. Operation oil is also delivered to the feedback chamber through the feedback port 122d, and a feedback force corresponding to the output pressure of the output port 122b acts on the spool 124 in the direction of the solenoid portion 110 side. Consequently, the spool 124 is stopped at a position where the thrust (attractive force) of the plunger 116, the spring force of the spring 128, and the feedback force are exactly balanced. In such case, a larger current applied to the coil 112, that is, a greater thrust of the plunger 116, will cause the spool 124 to move farther to the end plate 126 side such that the opening surface area of the input port 122a widens and the opening surface area of the drain port 122c narrows. At maximum conduction to the coil 112, the spool 124 moves as far to the end plate 126 side as the mobile range of the plunger 116 allows, such that the communication portion 123a communicates the input port 122a with the output port 122b, and the land 124a blocks the drain port 122c and cuts off communication between the output port 122b and the drain port 122e. Therefore, the maximum hydraulic pressure acts on the clutch C1. As described above, it is clear that the solenoid valve 100 of the embodiment functions as a normally closed solenoid valve because when conduction to the coil 112 is switched off, the input port 122a is cut off and the output port 122b communicates with the drain port 122c.

The operation of the solenoid valve 100 when functioning as an electromagnetic pump will be explained next. Here, a case where conduction to the coil 112 is switched from on to off will be considered. In this case, the spool 124 moves from the end plate 126 side to the solenoid portion 110 side. Therefore, negative pressure is generated inside the pump chamber 131, and the intake check valve 134 opens and the discharge check valve 136 closes, such that the pump chamber 131 intakes operation oil from the intake port 132a through the intake check valve 134. Once conduction to the coil 112 is switched on from this state, the spool 124 moves from the solenoid portion 110 side to the end plate 126 side. Therefore, positive pressure is generated inside the pump chamber 131, and the intake check valve 134 closes and the discharge check valve 136 opens, such that operation oil intaken by the pump chamber 131 is discharged from the discharge port 132b through the discharge check valve 136. Thus, application of a square wave current that repeatedly switches conduction to the coil 112 on and off (a control that will be hereinafter referred to as a square wave current control) enables the solenoid valve 100 of the embodiment to function as an electromagnetic pump that pressure feeds operation oil. The detailed description of the solenoid valve 100 is hereby concluded.

The switching valve 50 is formed from a sleeve 52, a spool 54 that slides in the axial direction inside the sleeve 52, and a spring 56 that biases the spool 54 in the axial direction. The sleeve 52 is formed with various ports: a signal pressure input port 52a that is input with the line pressure PL as a signal pressure from an oil passage 47 connected to the mechanical oil pump 42; an input port 52b that is connected to an oil passage 46 between the strainer 41a and the mechanical oil pump 42; an output port 52c that outputs operation oil input from the input port 52h; an input port 52d that is connected to the output port 122b of the pressure regulating valve portion 120 of the solenoid valve 100; an input port 52e that is connected to the discharge port 132b of the pump portion 130 of the solenoid valve 100; an output port 52f that is selectively input with hydraulic pressure from the two input ports 52d, 52e and outputs hydraulic pressure to the clutch C1; an input port 52g that is connected to the drain port 132c of the pump portion 130; and a drain port 52h that drains operation oil input from the input port 52g. When the line pressure PL is input to the signal pressure input port 52a of the switching valve 50, the spool 54 overcomes the biasing force of the spring 56 to move to the position shown on the right-hand side of the valve in the figure such that communication between the input port 52b and the output port 52c is cut off, the input port 52d communicates with the output port 52f, and the input port 52e is closed. Thus, the output port 122b of the pressure regulating valve portion 120 communicates with the clutch C1 side. When the line pressure PL is not input to the signal pressure input port 52a, the biasing force of the spring 56 causes the spool 54 to move to the position shown on the left-hand side of the valve in the figure. Consequently, the input port 52b communicates with the output port 52c, the intake port 132a of the pump portion 130 is connected to the oil passage 46 between the strainer 41a and the mechanical oil pump 42 through the switching valve 50, the port 52d is closed, and the input port 52e communicates with the output port 52f. Thus, the discharge port 132b of the pump portion 130 communicates with the clutch C1 side. Note that when the line pressure PL is input to the signal pressure input port 52a, the output port 52c communicates with the drain port 52h so that operation is not delivered to the intake port 132a of the pump portion 130, and the input port 52g communicates with the drain port 52h to drain operation oil from the drain port 132c of the pump portion 130.

The accumulator 90 is formed from a piston 92 and a spring 94. The piston 92 slides in an accumulator chamber that is input with and outputs hydraulic pressure from the oil passage 49, which is connected to the clutch C1 and the output port 52f of the switching valve 50. The spring 94 is biased so as to push the piston toward the oil passage 49 side. The accumulator 90 accumulates hydraulic pressure when the piston 92 correspondingly retracts against the biasing of the spring 94 as the hydraulic pressure acting on the clutch C1 increases. The accumulator 90 outputs accumulated hydraulic pressure when the piston 92 correspondingly pushes out due to the biasing force of the spring 94 as the hydraulic pressure acting on the clutch C1 decreases. The accumulator 90 is designed with an accumulation capacity capable of filling the oil passage that communicates the clutch C1 with the discharge port 132b of the pump portion 130 of the solenoid valve 100 with operation oil.

The AT ECU 26, although not shown in detail in the drawings, is constituted as a microprocessor based on a CPU. In addition to the CPU, the AT ECU 26 has a ROM that stores processing programs, a RAM that temporarily stores data, input and output ports, and a communication port. The AT ECU 26 is input with an input shaft rotation speed Nin from a rotation speed sensor 24 attached to the input shaft 36, an output shaft rotation speed Nout from a rotation speed sensor attached to the output shaft 38, and the like through an input port. The AT ECU 26 outputs drive signals to various solenoids such as the linear solenoid 44 and the solenoid valve 100, and the like through an output port. The AT ECU 26 communicates with the main ECU 60. The AT ECU 26 controls the automatic transmission 30 (hydraulic circuit 40) based on a control signal from the main ECU 60, and outputs data relating to the operation status of the automatic transmission 30 to the main ECU 60 as necessary.

The main ECU 60, although not shown in detail in the drawings, is constituted as a microprocessor based on a CPU. In addition to the CPU, the main ECU 60 has a ROM that stores processing programs, a RAM that temporarily stores data, input and output ports, and a communication port. The main ECU 60 is input through an input port with an ignition signal from an ignition sensor 70; a shift position SP from a shift position sensor 72 that detects an operation position of the shift lever 71; an accelerator position Ace from an accelerator pedal position sensor 74 that detects a depression amount of an accelerator pedal 73; a brake switch signal BSW from a brake switch 76 that detects depression of a brake pedal 75; and a vehicle speed V from a vehicle speed sensor 78. The main ECU 60 is also connected to the engine ECU 18 and the AT ECU 26 through communication ports, and exchanges various control signals and data with the engine ECU 18 and the AT ECU 26.

When the automobile 10 of the embodiment thus formed is running with the shift lever 71, in the Drive (D) running position, the engine 12 automatically stops when all preset automatic stop conditions are satisfied. Such automatic stop conditions include the vehicle speed V being zero, the accelerator off, and the brake switch signal BSW on. Once the engine 12 automatically stops, if a preset automatic start condition such as the brake switch signal BSW being off is subsequently satisfied, the automatically stopped engine 12 is automatically started.

Figure 6:
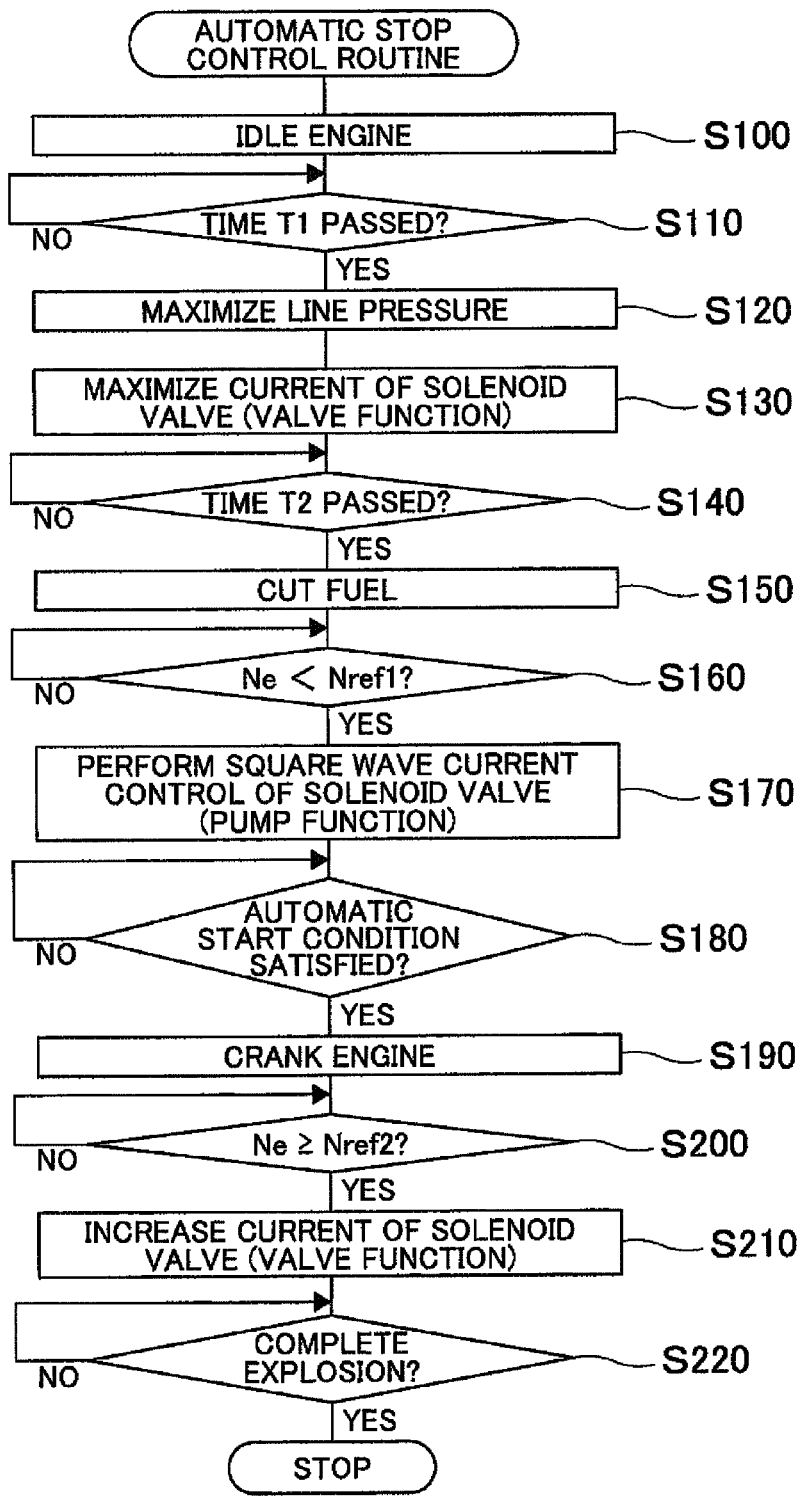
FIG. 6 is a flowchart that shows an example of an automatic stop control routine executed by a main ECU 60.

The operation of the power transmission device 20 of the embodiment thus formed and installed in the automobile 10, and more particularly the operation during an automatic stop of the engine 12, will be described next. FIG. 6 is a flowchart that shows an example of an automatic stop control routine executed by the main ECU 60. This routine is executed when the vehicle is running with the shift lever 71 in the D position and when the automatic stop conditions of the engine 12 are satisfied. In this running state, the switching valve 50 cuts off fluid communication between the clutch C1 and the discharge port 132b of the pump portion 130 of the solenoid valve 100, and connects the clutch C1 and the output port 122b of the pressure regulating valve portion 120 in a fluid communicating manner.

If the automatic stop control routine is executed, first, the CPU of the main ECU 60 transmits an idling command to the engine ECU 18 so as to idle the engine 12 (S100), and stands by for a predetermined time T1 (e.g. 100 ms, 150 ms, 200 ms, or the like) (S110). Once the predetermined time T1 has passed, the CPU of the main ECU 60 transmits a drive command to the AT ECU 26 to drivenly control the linear solenoid 44 so that the regulator valve 43 maximizes the line pressure PL (S120), and also transmits a drive command to the AT ECU 26 so that the maximum current is applied to the coil 112 of the solenoid valve 100 functioning as a linear solenoid (S130). The CPU of the main ECU 60 then stands by for a predetermined time T2 (e.g. 200 ms, 300 ms, 400 ms, or the like) (S140). In such case, the mechanical oil pump 42 is driving while the engine 12 idles. Therefore, if the maximum current is applied to the coil 112 of the solenoid valve 100 functioning as a linear solenoid, operation oil that is pressure fed by the mechanical oil pump 42 can act on the clutch C1 without regulation and the operation oil acting on the clutch C1 can be increased. This is done in order to increase the amount of hydraulic pressure accumulated in the accumulator 90. Once the predetermined time T2 has passed, the CPU of the main ECU 60 transmits a fuel cut command to the engine ECU 18 so as to cut the fuel to the engine 12 (S150). The CPU of the main ECU 60 then stands by until the engine speed Ne, which is detected by the rotation speed sensor 16 and input through communication from the engine ECU 18, is less than a predetermined speed Nref1 at which the mechanical oil pump 42 ceases to function (S160). Once the mechanical oil pump 42 stops, the line pressure PL is released and the switching valve 50 that is input with the line pressure PL as a signal pressure connects the clutch C1 and the discharge port 132b of the pump portion 130 in a fluid communicating manner, and cuts off fluid communication between the clutch C1 and the output port 122b of the pressure regulating valve portion 120. Therefore, hydraulic pressure accumulated in the accumulator 90 is guided to the discharge port 132b side of the pump portion 130. If the engine speed Ne is less than the predetermined speed Nref1, the CPU of the main ECU 60 transmits a square wave current control command to the AT ECU 26 so that the solenoid valve 100 functions as an electromagnetic pump and hydraulic pressure acting on the clutch C1 is maintained at a hydraulic pressure Pset, which is lower than the hydraulic pressure for complete engagement (S170). Here, as described above, the solenoid valve 100 is formed as an integrated solenoid valve having a pressure regulating valve portion 120 that functions as a linear solenoid and a pump portion 130 that functions as an electromagnetic pump. However, the solenoid valve 100 has only one solenoid portion 100 as a drive source and cannot perform both functions at the same time. For this reason, preparations to activate the electromagnetic pump cannot be made while the solenoid valve 100 functions as a linear solenoid. However, in the present embodiment, hydraulic pressure accumulated in the accumulator 90 can be delivered to the solenoid valve 100 side to prepare the solenoid valve 100 to function as an electromagnetic pump. Therefore, momentary drops in the hydraulic pressure acting on the clutch C1 can be suppressed. In addition, as mentioned above, the accumulator 90 is designed with an accumulation capacity capable of filling the oil passage that communicates the clutch C1 with the discharge port 132b of the pump portion 130 of the solenoid valve 100 with operation oil. Therefore, the solenoid valve 100 can smoothly switch from functioning as a linear solenoid to functioning as an electromagnetic pump. Note that in this embodiment, the solenoid valve 100 is designed with a pressure feeding performance as an electromagnetic pump such that an amount of operation oil from the pump portion 130 that leaked from a seal ring or the like provided between the piston and drum of the clutch C1 is replenished, and the clutch piston stands by in a low-pressure state that holds the clutch piston at the end of a stroke.

Next, the CPU of the main ECU 60 stands by until an automatic start condition is satisfied (S180). The CPU of the main ECU 60 then transmits a cranking command to the engine ECU 18 to drivenly control the starter motor 13 so as to crank the engine 12 (S190), and stands by until the engine speed Ne becomes equal to or greater than a predetermined speed Nref2 for determining operation of the mechanical oil pump 42 (S200). The CPU of the main ECU 60 subsequently transmits a drive command to the AT ECU 26 to switch the solenoid valve 100 from functioning as an electromagnetic pump to functioning as a linear solenoid, which increases the current applied to the coil 112 and engages the clutch C1 used for starting off (S210). If complete explosion of the engine 12 is then determined (S220), the present routine is ended. Thus, the solenoid valve 100 functions as a linear solenoid that regulates hydraulic pressure to the most suitable clutch pressure for engagement of the clutch C1. At such time, the intake port 132a of the pump portion 130 is connected to the oil passage 46 downstream of the strainer 41a and upstream of the mechanical oil pump 42, and no hydraulic pressure acts on the intake port 132a. Therefore, the existence of the pump portion 130 does not adversely affect the pressure regulating precision of the solenoid valve 100 when the solenoid valve 100 functions as a linear solenoid.

Figure 7:
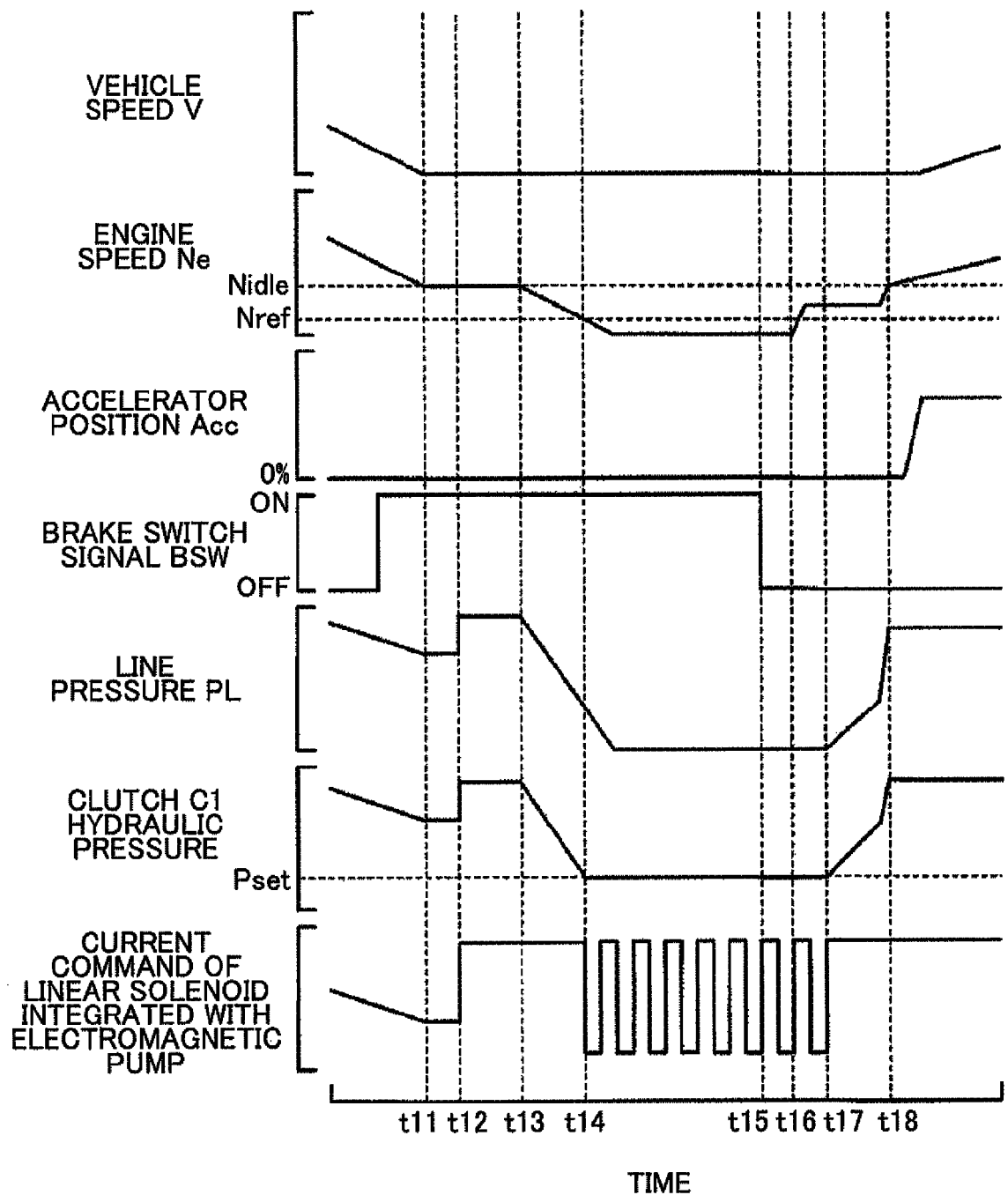
FIG. 7 is an explanatory drawing that shows how a vehicle speed V, an engine speed Ne, an accelerator position Acc, a brake switch signal BSW, a line pressure PL, a hydraulic pressure of the clutch C1, and a current command of a solenoid portion 110 of the solenoid valve 100 change over time.

FIG. 7 is an explanatory drawing that shows how the vehicle speed V, the engine speed Ne, the accelerator position Acc, the brake switch signal BSW, the line pressure PL, the hydraulic pressure of the clutch C1, and a current command of the solenoid portion 110 of the solenoid valve 100 change over time. As shown in the figure, the automatic stop conditions of the engine 12 are satisfied at a time t11. At a time t12, which is a predetermined time T1 after the time t11, the line pressure PL is maximized and the accumulator 90 connected to the clutch C1 accumulates hydraulic pressure with the maximum current applied to the solenoid portion 110 of the solenoid valve 100. After passage of the predetermined time T1, at a time t13, the fuel is cut and the engine speed Ne becomes less than the predetermined speed Nref at which the mechanical oil pump 42 ceases to function (time t14). The switching valve 50 that is input with the line pressure PL as a signal pressure connects the clutch C1 and the discharge port 132b of the pump portion 130 in a fluid communicating manner, and cuts off fluid communication between the clutch C1 and the output port 122b of the pressure regulating valve portion 120. As a consequence, hydraulic pressure accumulated in the accumulator 90 is guided to the discharge port 132b of the pump portion 130, which prepares the solenoid valve 100 to smoothly switch over to functioning as an electromagnetic pump. In addition, the square wave current control is executed for the solenoid valve 100 to deliver operation oil that is pressure fed from the pump portion 130 to the clutch C1. At a time t15, the brake is turned off, which satisfies an automatic start condition of the engine 12. Thus, at a time t16, cranking of the engine 12 is started by the starter motor 13, and the mechanical oil pump 42 starts operating due to rotation of the engine 12 (time t17). Consequently, the switching valve 50 cuts off fluid communication between the clutch C1 and the discharge port 132b of the pump portion 130, and connects the clutch C1 and the output port 122b of the pressure regulating valve portion 120 in a fluid communicating manner. The solenoid valve 100 switches to functioning as a pressure regulating valve and increases the current applied to the solenoid portion 110. Once the engine 12 achieves complete explosion at a time t18, the clutch C1 is completely engaged.

The power transmission device 20 of the embodiment described above is provided with a solenoid valve 100, a switching valve 50, and an accumulator 90. The solenoid valve 100 functions as a pressure regulating valve in which the line pressure PL from the mechanical oil pump 42, which is driven by the engine 12, is regulated and output by the pressure regulating valve portion 120 to the clutch C1 that forms a first forward speed. The solenoid valve 100 also functions as an electromagnetic pump that pressure feeds operation oil from the pump portion 130 to the clutch C1 based on a square wave current control of the solenoid portion 110. The switching valve 50 is selectively input with hydraulic pressure from the pressure regulating valve portion 120 and hydraulic pressure from the pump portion 130, and outputs hydraulic pressure to the clutch C1 side. The accumulator 90 accumulates hydraulic pressure acting on the clutch C1. When switching to hydraulic pressure from the pump portion 130 instead of hydraulic pressure from the pressure regulating valve portion 120, the oil passage that communicates the clutch C1 with the pump portion 130 fills with operation oil due to hydraulic pressure accumulated in the accumulator 90. Therefore, momentary drops in the hydraulic pressure acting on the clutch C1 can be suppressed. In addition, the accumulator 90 is designed with an accumulation capacity capable of filling the oil passage that communicates the clutch C1 with the pump portion 130 of the solenoid valve 100 with operation oil. Therefore, the solenoid valve 100 can smoothly switch from functioning as a linear solenoid to functioning as an electromagnetic pump. In addition, by providing an electromagnetic oil pump in parallel with the mechanical oil pump 42 and driving the electromagnetic oil pump when the engine 12 is automatically stopped, a significantly smaller pump size can be achieved in comparison to one that maintains the clutch C1 in a low-pressure state through a pressure regulating valve. Because the clutch C1 that forms the first forward speed for starting off is already standing by in a low-pressure state during an automatic stop of the engine 12, the clutch C1 can be rapidly and completely engaged when the accelerator pedal 73 is depressed to achieve a smooth start-off.

Figure 8:
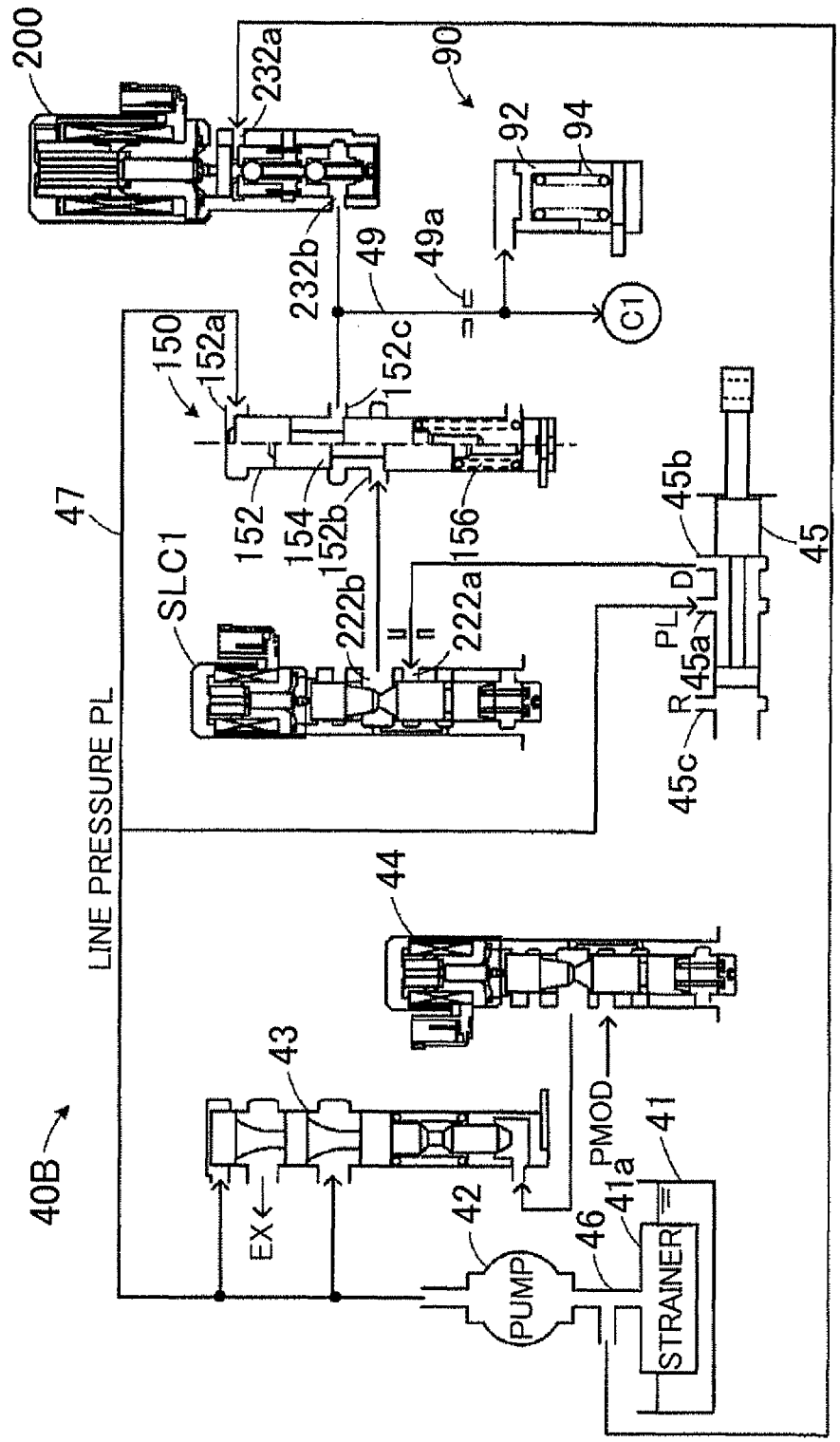
FIG. 8 is a structural diagram that shows an outline of the constitution of a hydraulic circuit 40B according to a modification.

In the power transmission device 20 of the embodiment, the solenoid valve 100 is constituted so as to function as both a linear solenoid and an electromagnetic pump. However, the linear solenoid and the electromagnetic pump may be formed as separate bodies. FIG. 8 is a structural diagram that shows an outline of the constitution of a hydraulic circuit 40B according to a modification. Like reference numerals are used for like structures of the hydraulic circuit 40 and the hydraulic circuit 40B in FIG. 8, and overlapping descriptions are omitted here. As shown in the figure, instead of the solenoid valve 100 and the switching valve 50, the hydraulic circuit 40B of the modification includes a linear solenoid SLC1, an electromagnetic pump 200, and a switching valve 150. The normally closed linear solenoid SLC1 is input with the line pressure PL, which it regulates and outputs. The electromagnetic pump 200 is formed with an intake port 232a that is connected to the oil passage 46 downstream of the strainer 41a and upstream of the mechanical oil pump 42, and a discharge port 232b that is connected to the clutch C1 side. The electromagnetic pump 200 intakes operation oil from the intake port 232a and discharges from the discharge port 232b. The switching valve 150 switches between communicating and cutting off communication between an output port 222b of the linear solenoid SLC1 and the clutch C1 side. Note that the linear solenoid SLC1 may obviously be a normally open type instead.

The switching valve 150 is formed from a sleeve 152, a spool 154 that slides in the axial direction inside the sleeve 152, and a spring 156 that biases the spool 154 in the axial direction. The sleeve 152 is formed with a signal pressure input port 152a that is input with the line pressure PL as a signal pressure; an input port 152b that is connected to the output port 222b of the linear solenoid SLC1; and an output port 152c that is connected to the discharge port 232b of the electromagnetic pump 200 and the clutch C1. When the line pressure PL is input to the signal pressure input port 152a of the switching valve 150, the spool 154 overcomes the biasing force of the spring 156 to move to the position shown on the left-hand side of the valve in the figure. Consequently, the input port 152b communicates with the output port 152c, and the output port 222b of the linear solenoid SLC 1 communicates with the clutch C1 side. When the line pressure PL is not input to the signal pressure input port 152a, the biasing force of the spring 156 causes the spool 154 to move to the position shown on the right-hand side of the valve in the figure. Consequently, the input port 152b is closed, and communication between the output port 222b of the linear solenoid SLC1 and the clutch C1 side is cut off.

Figure 9:
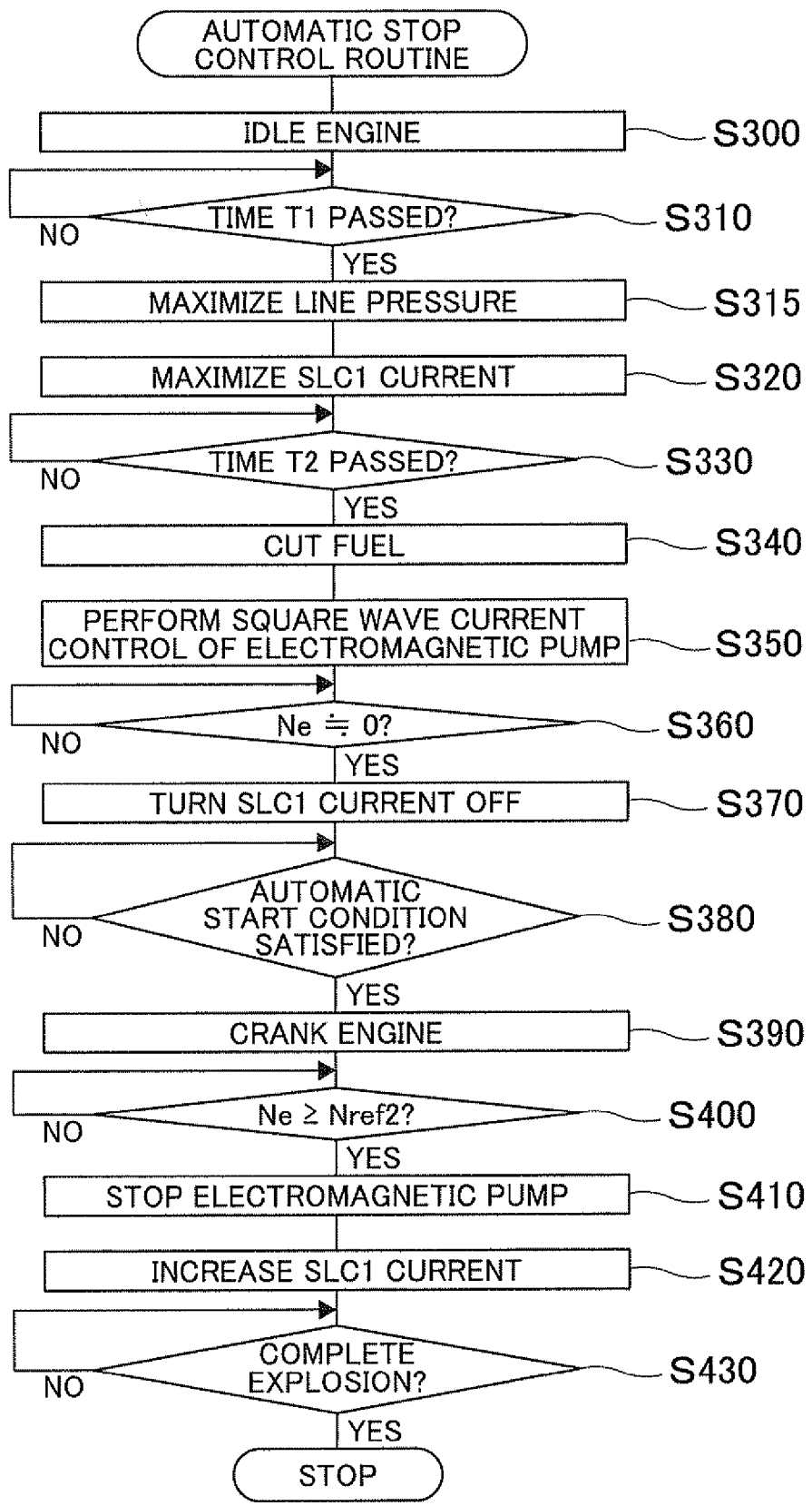
FIG. 9 is a flowchart that shows the automatic stop control routine according to a modification.
Figure 10:
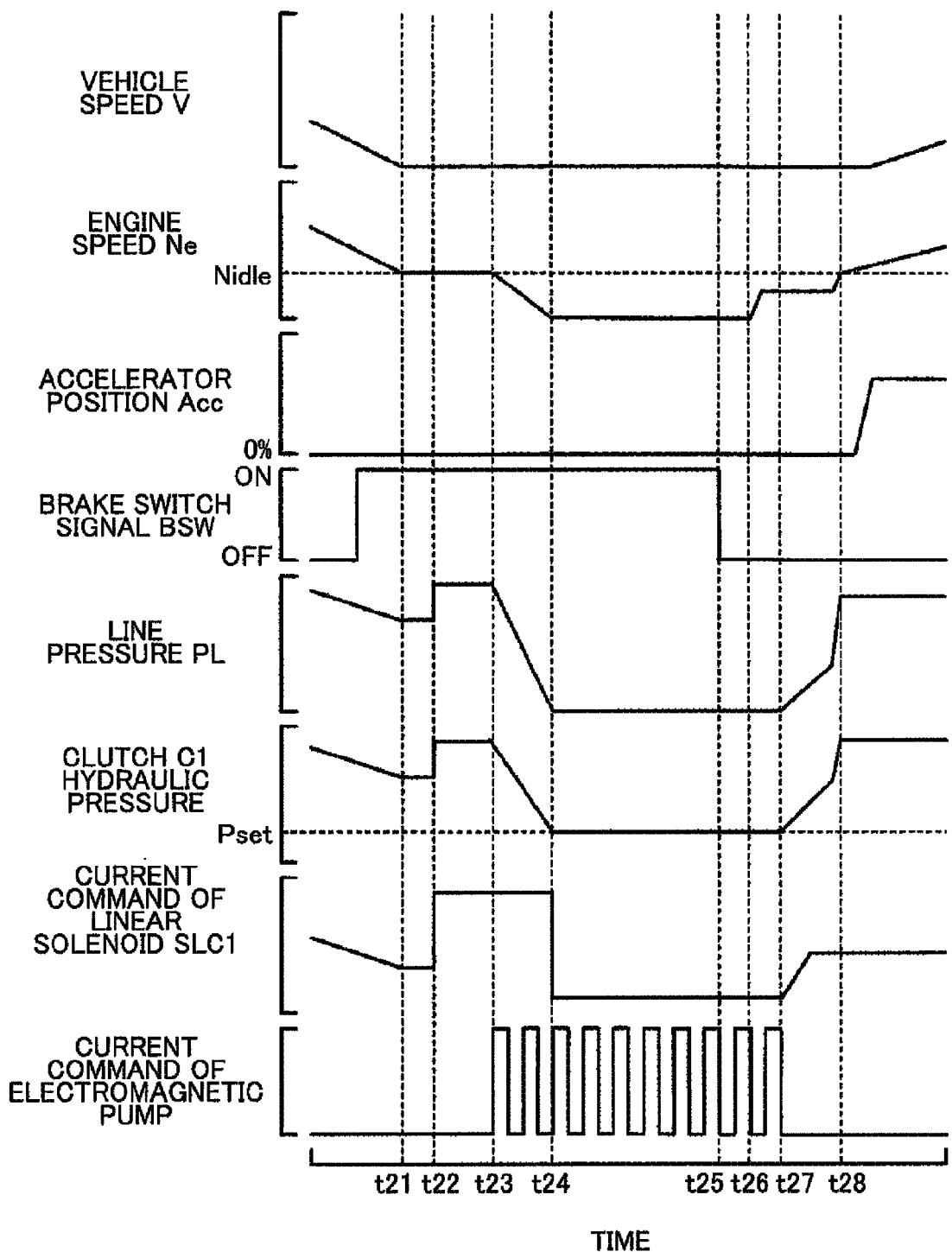
FIG. 10 is an explanatory drawing that shows how the vehicle speed V, the engine speed Ne, the accelerator position Acc, the brake switch signal BSW, the line pressure PL, the hydraulic pressure of the clutch C1, a current command of a linear solenoid SLC1, and a current command of an electromagnetic pump 200 change over time.

The operation of the power transmission device of the modification thus formed will be described next. FIG. 9 is a flowchart that shows the automatic stop control routine according to the modification. Note that processing among the automatic stop control routine according to the modification that is identical to that of the automatic stop control routine according to the embodiment will be described in simplified form. In the automatic stop control routine of the modification, the engine 12 is idled (S300), and after passage of the predetermined time T1 (S310), the linear solenoid 44 is drivingly controlled so as to maximize the line pressure (S315) and the maximum current is applied to the solenoid portion (coil) of the linear solenoid SLC1 (S320). After passage of the predetermined time T2 (S330), fuel to the engine 12 is cut (S340) and a square wave current control is performed that applies a square wave current to the solenoid portion (coil) of the electromagnetic pump 200 so as to start driving of the electromagnetic pump 200 (S350). If the engine speed Ne becomes generally zero (S360), the current applied to the linear solenoid. SLC1 is turned off (S370). If an automatic start condition is subsequently satisfied (S380), the starter motor 13 cranks the engine 12 (S390). Next, if the engine speed Ne becomes equal to or greater than the predetermined speed Nref 2 (S400), the electromagnetic pump 200 is stopped (S410) and the current applied to the solenoid portion of the linear solenoid SLC1 is increased (S420). Once the engine 12 achieves complete explosion (S430), the present routine is ended. FIG. 10 shows how the vehicle speed V, the engine speed Ne, the accelerator position Acc, the brake switch signal BSW, the line pressure PL, the hydraulic pressure of the clutch C1, a current command of the linear solenoid SLC1, and a current command of the electromagnetic pump 200 change over time.

In the power transmission device 20 of the embodiment, the accumulator 90 is designed with an accumulation capacity capable of filling the oil passage that communicates the discharge port 132b of the pump portion 130 of the solenoid valve 100 with the clutch C1. However, the accumulator 90 may instead have an accumulation capacity capable of at least partially filling the oil passage that communicates the discharge port 132b of the pump portion 130 with the clutch C1.

In the power transmission device 20 of the embodiment, the accumulator 90 is constituted as a spring accumulator having the piston 92 and the spring 94. However, any type of accumulator may be used, such as a hydraulic accumulator, provided that the accumulator can accumulate hydraulic pressure acting on the clutch C1.

In the power transmission device 20 of the embodiment, a control is performed so as to maximize the line pressure PL in the automatic stop control routine. However, any type of control is acceptable provided that the control increases the line pressure PL so as to increase the hydraulic pressure acting on the clutch C1.

In the power transmission device 20 of the embodiment, the solenoid valve 100 is constituted so as to intake operation oil that has been filtered from the oil passage 46 downstream of the strainer 41a and upstream of the mechanical oil pump 42. However, the solenoid valve 100 may be constituted so as to intake operation oil from any oil passage. Note that the constitution of the present embodiment is preferred in order to suppress operation failures caused by interference from foreign matter and the like.

Figure 11:
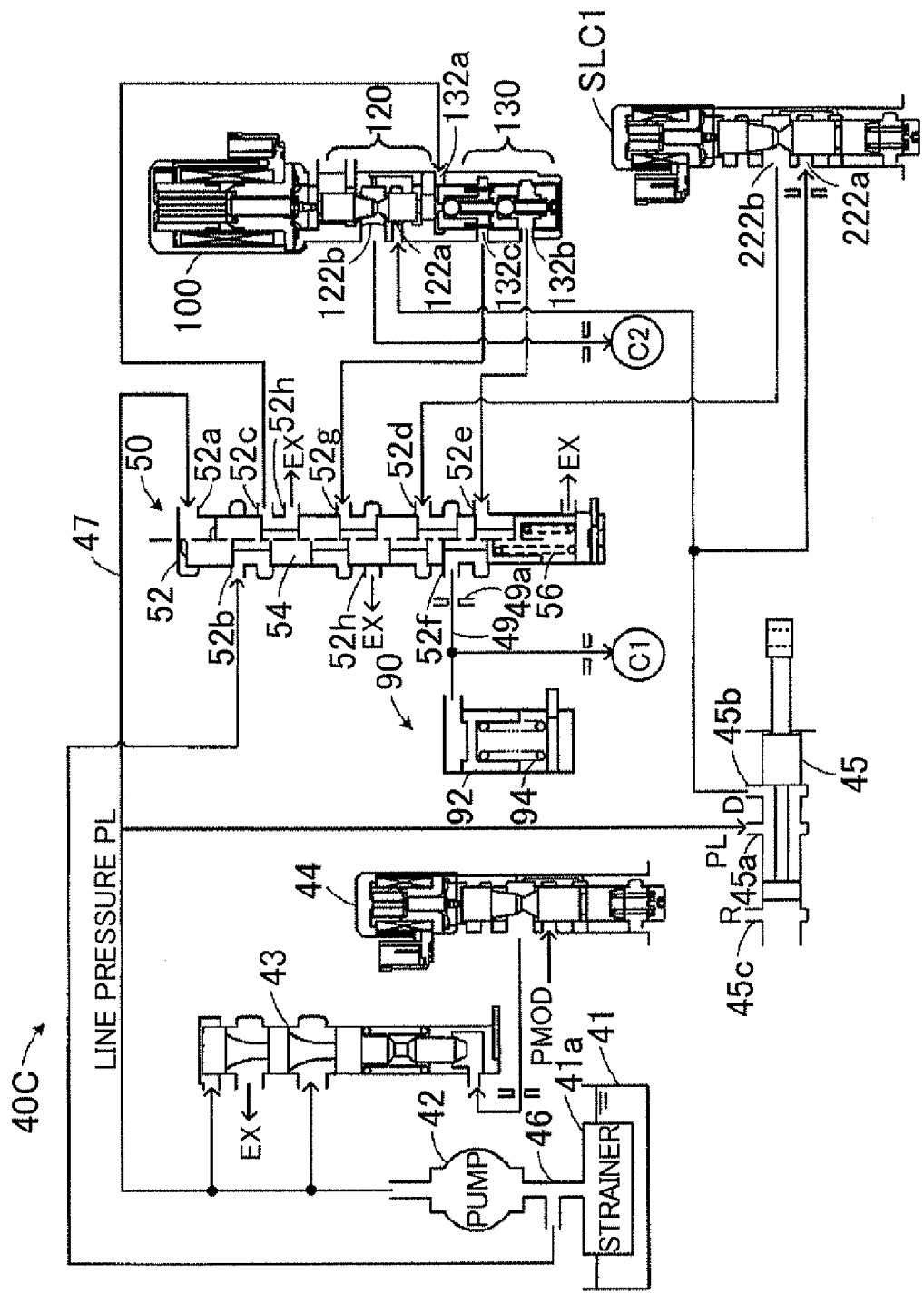
FIG. 11 is a structural diagram that shows an outline of the constitution of a hydraulic circuit 40C according to a modification.

In the power transmission device 20 of the embodiment, the solenoid valve 100 is constituted such that the line pressure PL from the mechanical oil pump 42 is regulated and output to the clutch C1 by the pressure regulating valve portion 120, and operation oil from the pump portion 130 is pressure fed to the clutch C1. However, the solenoid valve 100 may be constituted such that operation oil from the pump portion 130 is pressure fed to the clutch C1 and hydraulic pressure from the pressure regulating valve portion 120 is output to a brake or clutch other than the clutch C1. FIG. 11 is a structural diagram that shows an outline of the constitution of a hydraulic circuit 40C according to a modification. Like reference numerals are used for like structures of the hydraulic circuit 40, the hydraulic circuit 40B of a modification, and the hydraulic circuit 40C in FIG. 11, and overlapping descriptions are omitted here. As shown in the figure, in the hydraulic circuit 40C according to this modification, the output port 122b of the pressure regulating valve portion 120 of the solenoid valve 100 is connected to the clutch C2 instead of the input port 52d of the switching valve 50, and the input port 52d of the switching valve 50 is connected to the output port 222b of the linear solenoid SLC1. In other words, in the solenoid valve 100, operation oil is pressure fed from the pump portion 130 to the clutch C1 and hydraulic pressure from the pressure regulating valve portion 120 is output to the clutch C2.

In the power transmission device 20 of the embodiment, the switching valve 50 is driven using the line pressure PL. However, the switching valve 50 may be driven using the modulator pressure PMOD achieved by lowering the line pressure PL with a modulator valve (not shown). Alternatively, the line pressure PL or the modulator pressure may be supplied to the switching valve 50 through a solenoid valve, and the solenoid valve used to drive the switching valve 50. The switching valve 50 may also be driven by an electric motor and a conversion mechanism that converts the rotational motion of the electric motor into linear motion.

In the power transmission device 20 of the embodiment, the solenoid valve 100 functioning as a linear solenoid is constituted as a linear solenoid valve for direct control that directly controls the clutch C1 by generating an optimal clutch pressure from the line pressure PL. However, a linear solenoid may be used as a linear solenoid for pilot control to drive a separate control valve and the control valve may generate a clutch pressure to control the clutch C1.

Figure 12:
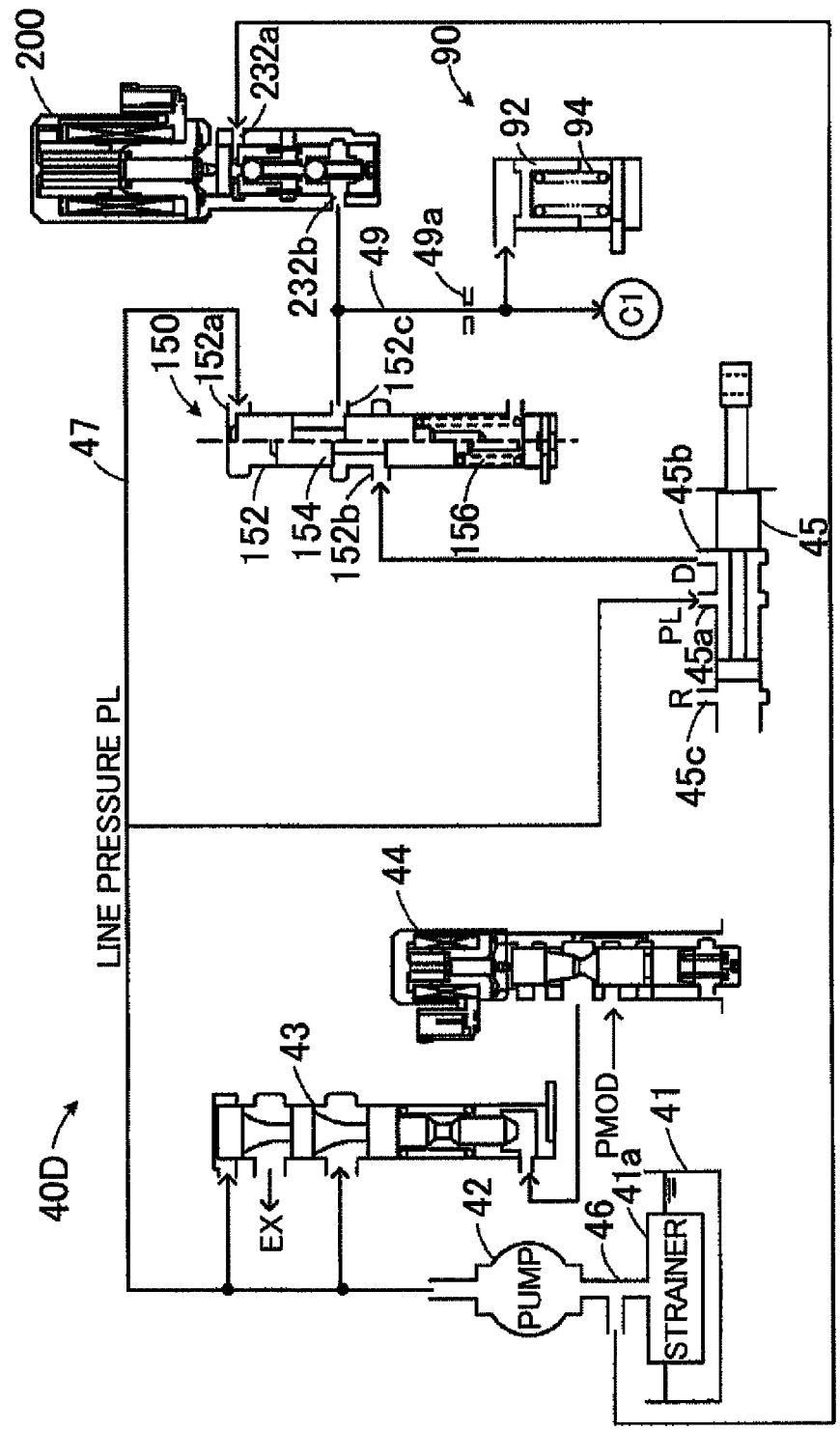
FIG. 12 is a structural diagram that shows an outline of the constitution of a hydraulic circuit 40D according to a modification.

In the power transmission device 20 of the embodiment, the line pressure PL is supplied to the clutch C1 through the pressure regulating valve portion 120 of the solenoid valve 100. However, the line pressure PL may be directly supplied to the clutch C1. FIG. 12 is a structural diagram that shows an outline of the constitution of a hydraulic circuit 40D according to a modification. Like reference numerals are used for like structures of the hydraulic circuit 40, the hydraulic circuits 4013, 40C of modifications, and the hydraulic circuit 40D in FIG. 12, and overlapping descriptions are omitted here. As shown in the figure, in the hydraulic circuit 40D according to this modification, the Drive-position (D-position) output port 45b of the manual valve 45 and the input port 152b of the switching valve 150 are directly connected. In other words, the line pressure PL is directly supplied to the clutch C1 without being regulated.

In the power transmission device 20 of the embodiment, the intake check valve 132 and the discharge check valve 134 are built into the sleeve 122. However, either one may be incorporated into any part of the valve body 102 besides the sleeve 122, or both may be incorporated into the valve body 102.

Here, the correspondence relation will be described between main elements in the embodiment and main elements of the invention as listed in the Summary of the Invention. In the embodiment, the engine 12 corresponds to a "motor"; the automatic transmission 30, the hydraulic circuit 40, the AT ECU 26, and the main ECU 60 correspond to a "power transmission device"; the mechanical oil pump 42 corresponds to a "mechanical pump"; the clutches C1 to C3 and the brakes B1 to B4 correspond to a "clutch"; (the solenoid portion 110 and the pump portion 130 of) the solenoid valve 100 corresponds to an "electromagnetic pump"; a constitution in which the oil passage 47 connected to the mechanical oil pump 42 guides the line pressure PL as a signal pressure to the signal pressure input port 52a of the switching valve 50 corresponds to a "valve drive portion"; and the main ECU 60 and the AT ECU 26 correspond to a "control unit". The solenoid portion 110 and the pressure regulating valve portion 120 of the solenoid valve 100 correspond to a "pressure regulating valve". Here, the motor is not limited to an internal combustion engine that outputs power using a hydrocarbon fuel such as gasoline or diesel. The motor may be any type of internal combustion engine, such as a hydrogen engine, or any type of motor capable of power output, such as an electric motor other than an internal combustion engine. The power transmission device incorporates the five-speed automatic transmission 30 with first to fifth forward speeds. However, the present invention is not limited to this example, and the power transmission device may incorporate an automatic transmission with any number of speeds, such as a four-speed, six-speed, or eight-speed automatic transmission. The power transmission device is also not limited to one that incorporates an automatic transmission. The power transmission device may take on any form provided that it has a clutch and can connect and disconnect an output shaft of the motor and an axle side by switching an engagement state of the clutch, wherein the power transmission is connected to the crankshaft 14 of the engine 12 through the clutch and directly connected to the wheels 86a, 86b through the differential gear 84. In addition, the electromagnetic pump is not limited to one that pressure feeds operation fluid to the clutch C1 which forms the first forward speed. For example, when a shift speed other than the first forward speed (such as the second forward speed) is set at start-off based on a driver instruction or the running condition, the electromagnetic pump may pressure feed operation oil to a clutch or brake that forms this speed. The pressure regulating valve is not limited to a normally closed solenoid valve, and may be constituted as a normally open solenoid valve. The control unit is not limited to the combination of the main ECU 60 and the AT ECU 26. The control unit may be realized by three or more electronic control units, or realized by one electronic control unit. Note that with regard to the correspondence relation between the main elements of the embodiment and the main elements of the invention as listed in the Summary of the Invention, the embodiment is only an example for giving a specific description of a best mode for carrying out the invention explained in the Summary of the Invention. This correspondence relation does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe a best mode for carrying out the present invention. However, the present invention is not particularly limited to such an example, and may obviously be carried out using various embodiments without departing from the scope of the present invention.

The present invention may be used in the automobile industry and the like.

The invention claimed is:

1. A power transmission device having an input shaft connected to an output shaft of a motor, and an output shaft connected to an axle side of a vehicle, wherein power input to the input shaft is transmitted to the output shaft connected to the axle side of the vehicle by switching an engagement state of a clutch of a plurality of clutches, the power transmission device comprising:
   a mechanical pump that uses power from the motor to generate and deliver a fluid pressure to the clutch;
   an electromagnetic pump that receives a supply of power to drive, and generates and delivers a fluid pressure to the clutch;
   an accumulator that is connected to an oil passage that connects the clutch and the electromagnetic pump, and accumulates fluid pressure acting on the clutch and the electromagnetic pump;
   a switching valve that selectively switches between connecting a mechanical pump side and the clutch in a fluid communicating manner and connecting the electromagnetic pump and the clutch in a fluid communicating manner;
   a valve drive portion that drives the switching valve so as to connect the mechanical pump side and the clutch when the mechanical pump is driving, and drives the switching valve so as to connect the electromagnetic pump and the clutch when the electromagnetic pump is driving in place of the mechanical pump;
   a regulator valve that regulates the fluid pressure generated by the mechanical pump to generate a line pressure; and
   a control unit, wherein when a stoppage control to stop the motor is being performed and before the motor stops, controls the regulator valve so as to increase the fluid pressure from the mechanical pump side acting on the clutch.

2. The power transmission device according to claim 1, wherein
   the accumulator is designed with a capacity that fills a flow passage that connects the clutch and the electromagnetic pump with operation fluid.

3. The power transmission device according to claim 1, wherein
   the switching valve comprises:
      a hollow sleeve formed with a first input port that is input with operation fluid from the mechanical pump, a second input port that is input with operation fluid from the electromagnetic pump, and an output port that outputs the inputted operation fluid to the clutch; and
      a spool that is a shaft-like member accommodated in the sleeve, and is moved in the axial direction by the valve drive portion to switch between a state that closes the second input port and communicates the first input port with the output port and a state that closes the first input port and communicates the second input port with the output port, wherein the accumulator is connected to a flow passage that connects the output port of the switching valve and the clutch such that, when the valve drive portion causes a flow passage of the switching valve to switch and connect the electromagnetic pump and the clutch, accumulated fluid pressure can be delivered to the electromagnetic pump through communication between the output port and the second input port of the switching valve.

4. The power transmission device according to claim 1, wherein the switching valve comprises:
  a hollow sleeve formed with an input port that is input with operation fluid from the mechanical pump, and an output port that outputs the inputted operation fluid to the clutch; and
  a spool that is a shaft-like member accommodated in the sleeve, and is moved in the axial direction by the valve drive portion to switch between a state that communicates the input port with the output port and a state that cuts off communication between the input port and the output port, wherein the electromagnetic pump is connected to a flow passage that connects the output port of the switching valve and the clutch, and the accumulator is connected to the flow passage that connects the output port of the switching valve and the clutch such that, when the valve drive portion causes a flow passage of the switching valve to switch and cut off the connection between the mechanical pump and the clutch, accumulated fluid pressure can be delivered to the electromagnetic pump.

5. The power transmission device according to claim 1, wherein the control unit performs the stoppage control that drivingly controls the electromagnetic pump, such that a lower fluid pressure than that when the clutch is completely engaged acts on the clutch in association with switching of a flow passage of the switching valve by the valve drive portion when stopping of the vehicle stops the motor.

6. The power transmission device according to claim 5, further comprising:

an automatic transmission capable of changing a transmission gear ratio and transmitting power from the motor to the axle side by switching an engagement state of the plurality of clutches, wherein the control unit performs the stoppage control on a clutch among the plurality of clutches that forms a transmission gear ratio for start-off if stopping of the vehicle stops the motor.

7. The power transmission device according to claim 1, wherein the valve drive portion is constituted so as to one of directly and indirectly guide a fluid pressure as a signal pressure from the mechanical pump to the switching valve to drive the switching valve, and the switching valve is constituted so as to connect the mechanical pump side and the clutch in a fluid communicating manner when the signal pressure is guided to the switching valve, and connect the electromagnetic pump and the clutch in a fluid communicating manner when the signal pressure is not guided to the switching valve.

8. The power transmission device according to claim 1, further comprising:

a pressure regulating valve that regulates and delivers the fluid pressure generated by the mechanical pump to the clutch, wherein the pressure regulating valve and the electromagnetic pump are formed integrated as a solenoid valve, and the solenoid valve comprises:
  a hollow sleeve that is formed with various ports;
  a spool that is a shaft-like member accommodated in the sleeve, and opens and closes the various ports by sliding in the axial direction;
  a spring that biases the spool in the axial direction; and
  a solenoid portion that generates thrust acting on the spool in a direction that opposes the spring, wherein a first port group comprising an input port that is input with operation fluid from the mechanical pump side, an output port that outputs operation fluid to the clutch side, and a discharge port is formed from among the various ports, and a pressure regulating chamber is formed between the sleeve and the spool so as to function as the pressure regulating valve that, by sliding of the spool in the axial direction, regulates a pressure of operation fluid that is input to the input port by discharge from a drain port and outputs operation fluid from the output port; and a second port group comprising an intake port that intakes operation fluid from the mechanical pump side, and a discharge port that discharges operation fluid to the clutch is formed from among the various ports, and a pump chamber is defined as a space between the sleeve and the spool and as cut off from the pressure regulating chamber so as to function as the electromagnetic pump that, by repeated generation and cancellation of the thrust from the solenoid portion, intakes operation fluid through the intake port and discharges operation fluid from the discharge port.

9. The power transmission device according to claim 1, wherein the motor is an internal combustion engine capable of an automatic stop and an automatic start.

10. A vehicle installed with a motor, and the power transmission device according to claim 1.

* * * * *